(12) United States Patent
Fujita

(10) Patent No.: US 8,145,492 B2
(45) Date of Patent: Mar. 27, 2012

(54) ROBOT BEHAVIOR CONTROL SYSTEM AND METHOD, AND ROBOT APPARATUS

(75) Inventor: Masahiro Fujita, Saitama (JP)

(73) Assignee: Sony Corporation, Tokyo (JP)

( * ) Notice: Subject to any disclaimer, the term of this patent is extended or adjusted under 35 U.S.C. 154(b) by 956 days.

(21) Appl. No.: 11/101,257

(22) Filed: Apr. 6, 2005

(65) Prior Publication Data

US 2005/0240412 A1    Oct. 27, 2005

(30) Foreign Application Priority Data

Apr. 7, 2004    (JP) ................................ 2004-113589

(51) Int. Cl.
*G10L 11/00*    (2006.01)

(52) U.S. Cl. ........ 704/270; 704/203; 704/219; 704/221; 704/223; 704/230; 704/232; 704/235; 704/254; 704/258; 704/260; 704/266; 704/267; 704/270.1; 704/275; 704/500; 706/10; 706/21

(58) Field of Classification Search ............ 704/232, 704/257, 258, 275, 500, 203, 219, 221, 223, 704/230, 235, 254, 260, 266, 267, 270.1; 3/232, 257, 258; 706/21, 10
See application file for complete search history.

(56) References Cited

U.S. PATENT DOCUMENTS

| | | | | |
|---|---|---|---|---|
| 4,979,188 A | * | 12/1990 | Kotzin et al. ............... | 375/254 |
| 5,095,443 A | * | 3/1992 | Watanabe ................... | 706/10 |
| 5,359,696 A | * | 10/1994 | Gerson et al. .............. | 704/223 |
| 5,377,302 A | * | 12/1994 | Tsiang ........................ | 704/235 |
| 5,410,635 A | * | 4/1995 | Sakoe ......................... | 704/232 |
| 5,488,704 A | * | 1/1996 | Fujimoto .................... | 704/219 |
| 5,553,194 A | * | 9/1996 | Seza et al. .................. | 704/221 |
| 5,594,833 A | * | 1/1997 | Miyazawa .................. | 704/221 |
| 5,682,463 A | * | 10/1997 | Allen et al. ................. | 704/230 |
| 5,699,484 A | * | 12/1997 | Davis ......................... | 704/200.1 |
| 6,070,140 A | * | 5/2000 | Tran ........................... | 704/275 |
| 6,081,780 A | * | 6/2000 | Lumelsky ................... | 704/260 |
| 6,134,528 A | * | 10/2000 | Miller et al. ................ | 704/258 |
| 6,161,091 A | * | 12/2000 | Akamine et al. ........... | 704/258 |
| 6,345,255 B1 | * | 2/2002 | Mermelstein ............... | 704/500 |

(Continued)

FOREIGN PATENT DOCUMENTS

JP    10-49188    2/1998

(Continued)

OTHER PUBLICATIONS

Japanese Office Action with English translation.

(Continued)

*Primary Examiner* — Michael Colucci
(74) *Attorney, Agent, or Firm* — Frommer Lawrence & Haug LLP; William S. Frommer; Ellen Marcie Emas

(57) ABSTRACT

A behavior control system of a robot for learning a phoneme sequence includes a sound inputting device inputting a phoneme sequence, a sound signal learning unit operable to convert the phoneme sequence into a sound synthesis parameter and to learn or evaluate a relationship between a sound synthesis parameter of a phoneme sequence that is generated by the robot and a sound synthesis parameter used for sound imitation, and a sound synthesizer operable to generate a phoneme sequence based on the sound synthesis parameter obtained by the sound signal learning unit.

11 Claims, 14 Drawing Sheets

U.S. PATENT DOCUMENTS

| | | | |
|---|---|---|---|
| 6,480,820 B1* | 11/2002 | Clopton et al. | 704/203 |
| 6,509,707 B2* | 1/2003 | Yamashita et al. | 318/567 |
| 6,587,846 B1* | 7/2003 | LaMuth | 706/21 |
| 6,683,960 B1* | 1/2004 | Fujii et al. | 381/71.8 |
| 7,197,460 B1* | 3/2007 | Gupta et al. | 704/270.1 |
| 7,319,959 B1* | 1/2008 | Watts | 704/254 |
| 7,412,390 B2* | 8/2008 | Kobayashi et al. | 704/267 |
| 2001/0007096 A1* | 7/2001 | Yamada et al. | 704/258 |
| 2001/0018651 A1* | 8/2001 | Takamizawa | 704/230 |
| 2001/0021907 A1* | 9/2001 | Shimakawa et al. | 704/260 |
| 2001/0021909 A1* | 9/2001 | Shimomura et al. | 704/275 |
| 2002/0019678 A1 | 2/2002 | Mizokawa | |
| 2003/0033141 A1* | 2/2003 | Kondo et al. | 704/219 |
| 2003/0055653 A1* | 3/2003 | Ishii et al. | 704/275 |
| 2003/0093280 A1* | 5/2003 | Oudeyer | 704/266 |
| 2004/0019484 A1* | 1/2004 | Kobayashi et al. | 704/258 |
| 2005/0027540 A1* | 2/2005 | Yamada et al. | 704/275 |

FOREIGN PATENT DOCUMENTS

| | | |
|---|---|---|
| JP | 10-97267 | 4/1998 |
| JP | 11-85194 | 3/1999 |
| JP | 11-311999 | 11/1999 |
| JP | 2002-49385 | 2/2002 |
| JP | 2002-189488 | 7/2002 |
| JP | 2002-239952 | 8/2002 |
| JP | 2002-264057 | 9/2002 |
| JP | 2002-268656 | 9/2002 |
| JP | 2002-337075 | 11/2002 |
| JP | 2003-334785 | 11/2003 |

OTHER PUBLICATIONS

Masahiro Fujita, et al., "Interaction by the sound in Entertainment Robot", AI challenge study group (No. 13) Artificial intelligence society study group document, Jun. 15, 2001, p. 29-34.

* cited by examiner

ROBOT BEHAVIOR CONTROL SYSTEM AND METHOD, AND ROBOT APPARATUS

CROSS REFERENCES TO RELATED APPLICATIONS

The present invention contains subject matter related to Japanese Patent Application JP 2004-113589 filed in the Japanese Patent Office on Apr. 7, 2004, the entire contents of which are incorporated herein by reference.

BACKGROUND OF THE INVENTION

1. Field of the Invention

The present invention relates to a robot behavior control system and method and a robot apparatus in which a robot is capable of acting autonomously to achieve realistic communication with users. In particular, the present invention relates to a behavior control system and method and a robot apparatus in which a robot is capable of selecting an appropriate behavior from a comprehensive consideration of conditions of the robot, such as the external environment detected by sensory recognition, such as visual or auditory recognition, and internal states including instincts and feelings.

More specifically, the present invention relates to a robot behavior control system and method and a robot apparatus in which a robot is capable of selecting an instinctive or reflexive situated behavior or any other behavior based on external environments and internal states. In particular, the present invention relates to a robot behavior control system and method and a robot apparatus in which a robot is capable of evolving by self-development through imitation, learning, etc.

2. Description of the Related Art

A mechanical apparatus which utilizes electric or magnetic actions to perform motions which resemble motions of human beings is referred to as a "robot." It is said that the word robot is etymologically derived from the Slavic word "ROBOTA (slave machine)." In Japan, robots have become widespread since the end of 1960s, but most of them have been manipulators or industrial robots such as conveyor robots for the purpose of automated or unmanned production operations in factories.

Recently, research and development has advanced on the structure and stable walking control of legged mobile robots including pet robots which imitate body mechanisms and motions of quadrupled animals, such as dogs and cats, and "human like" or "humanoid" robots which imitate body mechanisms and motions of upright bipedal animals, such as human beings and apes. Thus, expectations on the practical use of such legged mobile robots have increased. Legged mobile robots are less stable and have more difficult posture control and walk control than crawler robots, but are advantageous in that they can realize flexible walking and running motions such as moving up and down the stairs and leaping over obstacles.

Other than industrial uses, uses of recent robot apparatuses include living uses, i.e., "symbiosis" uses with human beings or "entertainment" uses. Traditional toy machines have a fixed relationship between a user operation and a responsive motion, and it may be impossible to modify the motions of the toys according to the preference of users. As a result, users soon get tired of such toys that repeat the same motions. On the other hand, intelligent robot apparatuses have behavior models or learning models which originate from motions, and allow the models to be modified based on external input information, such as voices, images, or touch, to determine a motion, thereby realizing an autonomous thought and motion control. Such intelligent robot apparatuses further include an interface with human being using recognition technology, such as image recognition and speech recognition, and allow intelligent realistic communication.

In a typical behavior selection mechanism of robots or other real-time interactive systems, behaviors are sequentially selected in response to changes in the external environment detected by sensory recognition such as visual recognition and auditory recognition. In another behavior selection mechanism, the internal state of the system is managed using models of emotions including instincts and feelings, and behaviors are selected in response to changes in the internal state.

For example, the internal state includes an "instinct" aspect that corresponds to access to the limbic system in a living organism, an aspect derived from ethological models, such as innate desire and social desire, which corresponds to access to the cerebral neocortex, and a "feeling" aspect, such as joy, grief, anger, and surprise.

The internal state of the system changes not only when the external environment changes but also when a selected behavior is exhibited.

For example, Japanese Unexamined Patent Application Publication No. 2003-334785 discloses a robot apparatus that selects a behavior from a comprehensive consideration of the conditions of the robot, such as a result of recognition of an external environment through a visual sense or an auditory sense and an internal state including an instinct and a feeling.

The robot apparatus disclosed in this publication includes a plurality of behavior modules, each having a behavior evaluation section outputting an evaluation of a behavior of the robot apparatus responsive to an internal state or an external input, and a behavior instruction output section outputting an instruction for behavior execution of the robot apparatus. The robot apparatus determines an optimum behavior module from a comprehensive point of view in response to an external stimulus and a change in the internal state based on the evaluation obtained from the behavior evaluation section of each behavior module. Thus, concurrent evaluation is realized. Moreover, resource-based behavior selection is realized. That is, an evaluation of a behavior is output from a behavior module in a lower layer to a behavior module in a higher layer in the layered structure, and a behavior module is selected based on the evaluation and a resource used by the robot apparatus. Thus, concurrent selection is realized.

It is expectable that a more intelligent robot apparatus not only allows a robot to exhibit a behavior in the manner described above but also allows a robot to autonomously learn and to evolve by self-development.

Generally, learning mechanisms in robots and other automatic machines are implemented using neural networks or other mathematical models.

A neural network is a simplified simulation of the neural network connections of the human brain, and is a network of nerve cells or neurons that are connected through synapses via which signals are transmitted in one direction. Signals are communicated between neurons through synapses, and the synapse resistance, or weight, is appropriately adjusted to perform various information processing. Each neuron has synapse-weighted inputs from one or more other neurons, and outputs the sum of the inputs, which is modified using non-linear response functions, to another neuron. In neural-network-based control, non-linear problems, such as friction and viscosity, are overcome, and, due to its learning ability, there is no need for changing parameters.

For example, in a neural-network-based robot system, motion patterns are stored in association with symbols input by voices or the like (see, for example, Japanese Unexamined Patent Application Publication No. 2002-337075). In the robot system disclosed in this publication, a relatively long motion or any other motion is divided into segments, and the motion segments are stored in association with input symbols recognized by speech recognition or the like. It is possible to play back a motion in response to an instruction for a relatively long motion pattern. It is also possible to exhibit a motion similar to a desired motion by association with a symbol input by voice if the same motion as the desired motion has not been directly learned. An architecture that employs a recurrent neural network includes internal feedback connections, in which information transmitted in a loop previous to the current loop is held in the network, and deals with recording of time-series data.

In general, human beings and other animals after which robots are modeled learn through simulation, that is, imitation of parents (or caregivers), based on stimuli.

SUMMARY OF THE INVENTION

Therefore, it is desirable to provide a high-performance robot behavior control system and method and a robot apparatus in which a robot is capable of acting autonomously to achieve realistic communication with users.

It is further desirable to provide a high-performance robot behavior control system and method and a robot apparatus in which a robot is capable of selecting an appropriate behavior from a comprehensive consideration of conditions of the robot, such as the external environment detected by sensory recognition, such as visual or auditory recognition, and internal states including instincts and feelings.

It is further desirable to provide a high-performance robot behavior control system and method and a robot apparatus in which a robot is capable of selecting an instinctive or reflexive situated behavior or any other type behavior based on an external environment and an internal state.

It is further desirable to provide a high-performance robot behavior control system and method and a robot apparatus in which a robot is capable of learning autonomously and evolving by self-development through imitation, learning, etc.

According to an embodiment of the present invention, there is provided a behavior control system of a robot for learning a phoneme sequence. The system includes sound inputting means for inputting a phoneme sequence, sound signal learning means for converting the phoneme sequence into a sound synthesis parameter and for learning or evaluating a relationship between a sound synthesis parameter of a phoneme sequence that is generated by the robot and a sound synthesis parameter used for sound imitation, and sound synthesizing means for generating a phoneme sequence based on the sound synthesis parameter obtained by the sound signal learning means. The sound inputting means may include a cochlear filter bank.

The term "system" means a logical set of apparatuses (or functional modules implementing particular functions), and these apparatuses or functional modules are not necessarily housed in a single housing.

According to an embodiment of the present invention, therefore, in the behavior control system, a sound synthesis parameter, which is a basic phoneme sequence element, is introduced into the sound synthesizing means, and a phoneme sequence formed of a sound signal is output. This phoneme sequence is converted by the cochlear filter bank into a phoneme sequence in which speaker individuality is reflected.

The sound signal learning means generates a sound synthesis parameter used for sound imitation from the phoneme sequence in which speaker individuality is reflected. The generated sound synthesis parameter is introduced into the sound synthesizing means, and a phoneme sequence acquired by sound imitation is generated.

The sound signal learning means evaluates the difference between the sound synthesis parameter input to the behavior control system and the sound synthesis parameter used for sound imitation, and performs learning.

The behavior control system may further include internal state generating means for generating an internal state or a body constraint, and mapping means for mapping the internal state to a sound synthesis parameter. This allows a phoneme to be pronounced with different characteristics in view of the internal state or body constraints.

The internal state generating means generates an internal state, and the mapping means converts the generated internal state into a sound synthesis parameter for generating a phoneme sequence indicating this internal state. The converted sound synthesis parameter is introduced into the sound synthesizing means, and a phoneme sequence formed of the sound signal is output. This phoneme sequences is input to the cochlear filter bank, and is then converted into a phoneme sequence in which speaker individuality is reflected. The sound signal learning means generates a sound synthesis parameter used for sound imitation from the phoneme sequence in which speaker individuality is reflected. The generated sound synthesis parameter is introduced into the sound synthesizing means, and a phoneme sequence acquired by sound imitation is generated.

Thus, the behavior control system allows self-analysis and learning (predictive error or correlation learning) of input vocal sounds produced at random. When the robot produces the same sound as a sound significant to the human, it can analyze and learn it, thus achieving a combination of individuality-reflected learning and learning with vocal reinforcement. Therefore, the robot apparatus can learn which parameter in its voice the voice detected through the auditory sense corresponds to, and can learn a significant sound.

In the behavior control system, the mapping means may inversely estimate an internal state corresponding to an input sound synthesis parameter using an inverse function during mapping. Thus, when human voice is detected, the robot can determine its internal state using inverse mapping.

According to another embodiment of the present invention, there is provided a behavior control system of a robot for determining a behavior to be exhibited based on an internal state and an external environment and performing predictive learning. The robot includes driving means for driving the robot in response to a driving instruction, internal state managing means for managing the internal state, and measuring means for measuring an external stimulus or a physical environment. The behavior control system includes predictive learning means for estimating a predicted value of the driving instruction for the robot, the internal state, and the physical environment based on a current observed value concerning the driving instruction for the robot, the internal state, and the physical environment and a current target value concerning the driving instruction for the robot, the internal state, and the physical environment.

The robot is surrounded by four worlds: a currently observed world, a current target world, a predicted world, and a next observed world as a result of motion of the robot. Each world is represented by parameters indicating the driving instruction for the robot, the internal state, and the physical environment.

The predictive learning means may be formed of a feed-forward neural network, or a correlation learning unit.

The predictive learning means may perform predictive learning based on deviation or correlation between a predicted value of the driving instruction for the robot, the internal state, and the physical environment and a next observed value of the driving instruction for the robot, the internal state, and the physical environment.

According to an embodiment of the present invention, therefore, in the behavior control system, the robot implements not only the robot's body dynamics but also tool-based tool dynamics. The robot implements the tool-based tool dynamics using a tool-based interaction with the external environment.

The predictive learning means may use a tool used to manipulate the physical environment, a body image that is obtained by manipulating the physical environment using the tool, and the environment. Thus, the predictive learning means can learn tool dynamics with the same framework as that described above, and can use the learned tool dynamics as a "tool".

When the robot apparatus realizes self-development using a learning mechanism, an excessively complicated theme may cause learning results to be less converged, leading to inefficient learning. According to an embodiment of the present invention, therefore, the learning mechanism may have the concept of development scenario.

A development scenario includes a plurality of learning phases. In each learning phase, factors of a flexible movement realized by the robot, e.g., the joint angle, the torque limit, etc., or a list of behaviors to be performed, e.g., instinctive behaviors, reflexive behaviors, etc., are defined at individual stages of learning. Each learning phase is managed using files. The development scenario is realized by accessing files corresponding to individual stages of learning.

Changes of the learning phases may be controlled over time, or may be controlled based on deviation or correlation between the predicted value estimated by the predictive learning means and the next observed value. When the robot acts in accordance with a predicted value, it may be determined that the current learning phase has been accomplished, and the robot may enter the next learning phase.

Therefore, a high-performance robot behavior control system and method and a robot apparatus in which a robot acts autonomously to achieve realistic communication with users can be realized.

Furthermore, a high-performance robot behavior control system and method and a robot apparatus in which a robot selects an appropriate behavior from a comprehensive consideration of conditions of the robot, such as the external environment detected by sensory recognition, e.g., visual and auditory recognition, and internal states, e.g., instincts and feelings, can be realized.

Furthermore, a high-performance robot behavior control system and method and a robot apparatus in which a robot selects an instinctive or reflexive situated behavior or any other type behavior based on an external environment and an internal state can be realized.

Furthermore, a high-performance robot behavior control system and method and a robot apparatus in which a robot learns autonomously and evolves by self-development through imitation, learning, etc., can be realized.

Other features and advantages of the present invention will become apparent from the following detailed description of embodiments of the present invention taken with reference to the drawings.

DESCRIPTION OF THE PREFERRED EMBODIMENTS

Embodiments of the present invention will now be described in detail.

Figure 1:
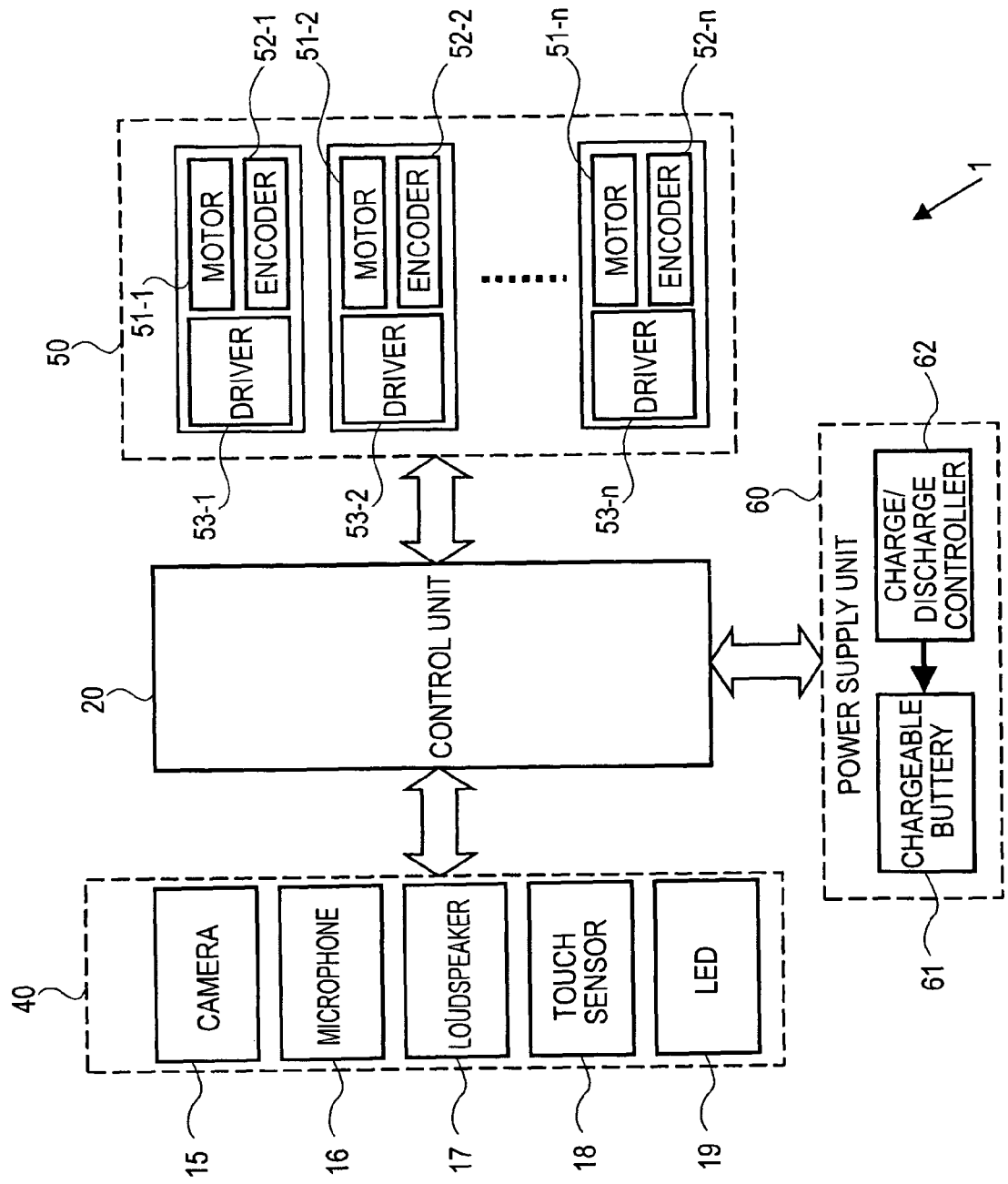
FIG. 1 is a schematic block diagram of a robot apparatus according to an embodiment of the present invention.

FIG. 1 schematically shows the functional structure of a robot apparatus 1 according to an embodiment of the present invention. As shown in FIG. 1, the robot apparatus 1 includes a control unit 20 for controlling the overall operation and performing other data processing, a input/output unit 40, a driving unit 50, and a power supply unit 60.

The input/output unit 40 has an input section and an output section. The input section includes a charge-coupled device (CCD) camera 15 designed as an eye of the robot apparatus 1, a microphone 16 designed as an ear of the robot apparatus 1, a touch sensor 18 disposed at the position of a head or back of the robot apparatus 1 for sensing a touch of a user, and other sensors equivalent to the five human senses. The output section includes a loudspeaker 17 designed as a mouth of the robot apparatus 1, and a light emitting diode (LED) indicator (eye lamp) 19 that is turned on and off or turned on at certain intervals to give facial expressions. The output section represents a user feedback from the robot apparatus 1 in form other than mechanical motion patterns using legs, etc., by outputting sound and turning on and off the lamp.

The input devices, such as the camera 15, the microphone 16, and the touch sensor 18, convert a detection signal into a digital signal, and perform digital signal processing. For example, the microphone 16 includes a digital signal processor (DSP) that performs filtering using a cochlear filter bank and other digital signal processing.

The camera 15 in the robot apparatus 1 recognizes the shape and color of an object in a workspace. In addition to a video device, e.g., the camera 15, the robot apparatus 1 may further include a receiving device receiving radiation waves such as infrared ray, acoustic waves, ultrasonic waves, and radio waves. Thus, the position and orientation of the object with respect to the source can be measured based on sensor outputs of transmission waves detected.

The driving unit 50 realizes body motions of the robot apparatus 1 according to a predetermined motion pattern requested by the control unit 20 under behavior control. The driving unit 50 is a functional module that drives joints of the robot apparatus 1 for flexible movements, and includes a plurality of driving sections individually provided for the articulation axes of movements of the joints, such as a roll, a pitch, and a yaw. Each driving section includes a motor 51 (51-1, 51-2, . . . 51-n) that rotates on a predetermined axis, and an encoder 52 (52-1, 52-2, . . . 52-n) that detects the rotational position of the motor 51, and a driver 53 (53-1, 53-2, . . . 53-n) that adaptively controls the rotational position or rotational speed of the motor 51 based on an output of the encoder 52.

The robot apparatus 1 is configured as a legged mobile robot, e.g., a bipedal walking robot or a quadrupled walking robot, by appropriately combining the driving sections.

The power supply unit 60 is a functional module that supplies power to electric circuits in the robot apparatus 1. The robot apparatus 1 according to the present embodiment is a self-driven robot using a battery, and the power supply unit 60 includes a chargeable battery 61 and a charge/discharge controller 62 that manages the charged/discharged state of the chargeable battery 61.

The chargeable battery 61 is in form of, for example, a "battery pack" having a plurality of lithium-ion secondary battery cells packaged in a cartridge. The charge/discharge controller 62 determines the remaining life of the battery 61 by measuring a terminal voltage and the amount of charging/discharging current of the battery 61, the ambient temperature of the battery 61, etc., and determines the charging start time and the charging stop time. The charging start time and the charging stop time, determined by the charge/discharge controller 62, are sent to the control unit 20, and trigger the robot apparatus 1 to start and stop a charging operation.

The control unit 20 serves as a "brain," and is disposed at, for example, the head or body of the robot apparatus 1.

Figure 2:
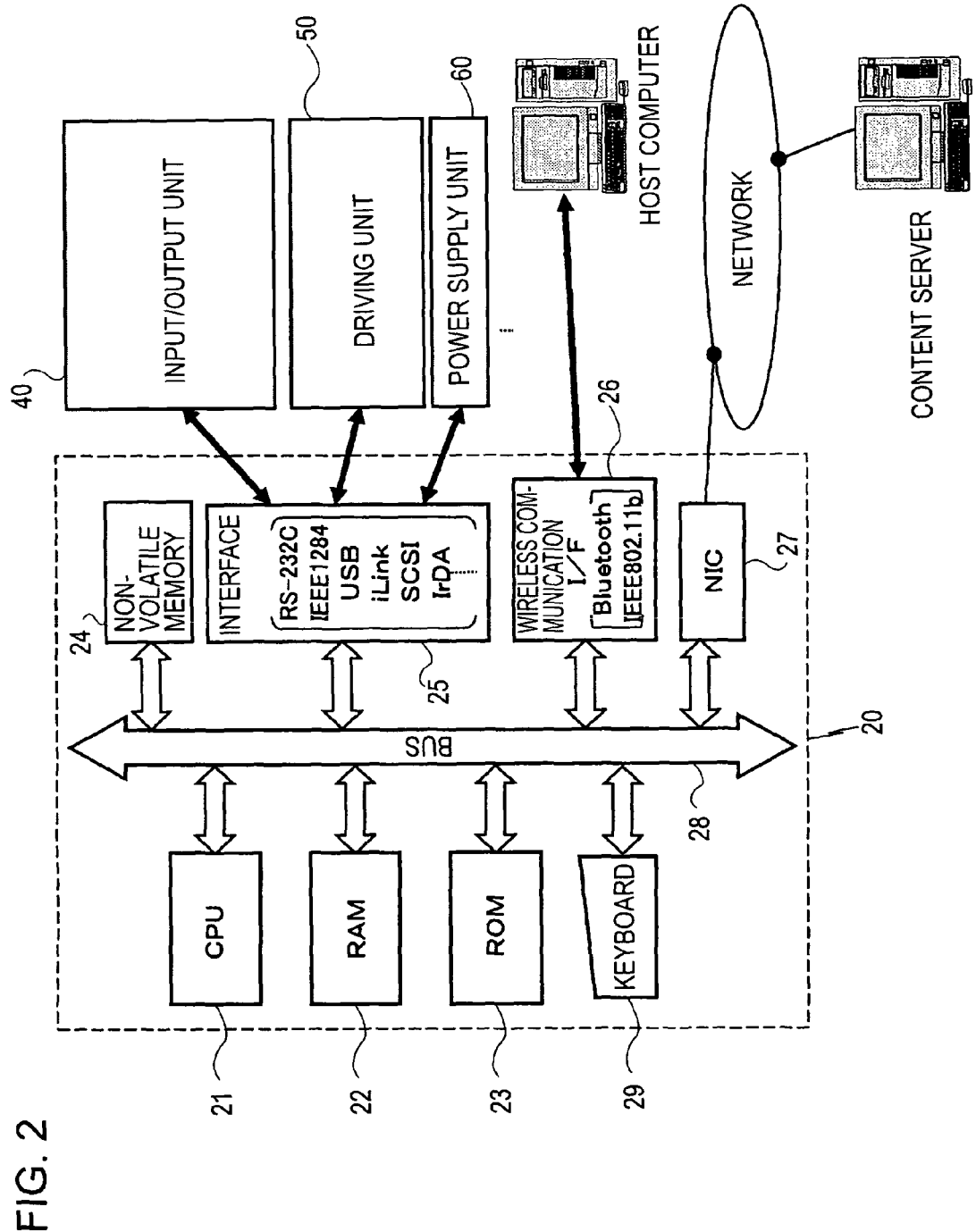
FIG. 2 is a block diagram of a control unit in the robot apparatus.

FIG. 2 illustrates the structure of the control unit 20 in more detail. As shown in FIG. 2, the control unit 20 is configured such that a central processing unit (CPU) 121 serving as a main controller is connected to memory devices and other circuit components and to peripheral devices via a bus 28. The bus 28 is a common signal transmission path including a data bus, an address bus, a control bus, etc.

A random access memory (RAM) 22 is a writable memory formed of a volatile memory, such as a dynamic RAM (DRAM). The RAM 22 loads a program code to be executed by the CPU 21, and temporarily stores work data acquired by an execution program.

A read-only memory (ROM) 23 persistently stores programs and data. The program code stored in the ROM 23 includes a self-diagnostic test program to be executed when the robot apparatus 1 is powered on, an operation control program for defining the operation of the robot apparatus 1, etc.

The robot apparatus 1 according to the present embodiment executes the operation control program to perform behavior control in response to external stimuli recognized and changes in the internal state. A system configuration for behavior control is discussed below.

A non-volatile memory 24 is formed of, for example, an electrically erasable and rewritable memory device such as an electrically erasable and programmable ROM (EEPROM). The non-volatile memory 24 is used to hold, in a non-volatile manner, data to be sequentially updated. The data to be sequentially updated includes security information, e.g., a serial number and an encryption key.

An interface 25 interconnects to a device external to the control unit 20 to exchange data. The interface 25 inputs and outputs data to and from the input/output unit 40, e.g., the camera 15, the microphone 16, and the loudspeaker 17. The interface 25 also inputs and outputs data and commands to and from the drivers 53-1, 53-2, . . . 53-n in the driving unit 50.

The interface 25 may include a serial interface such as RS (Recommended Standard)-232C interface, a parallel interface such as an IEEE (Institute of Electrical and Electronics Engineers) 1284 interface, and general-purpose interfaces for establishing connection to computer peripheral devices, such as a USB (Universal Serial Bus) interface, an i-Link (IEEE 1394) interface, a SCSI (Small Computer System Interface) interface, and a memory card interface, for transporting programs and data to and from a locally connected external device.

The interface 25 may further include an infrared communication (IrDA) interface to perform wireless communication with an external device.

The control unit 20 further includes a wireless communication interface 26, and performs wireless data communication with an access point (not shown) located within several meters from the robot body via short-range wireless data communication technology, such as Bluetooth™, or a wireless network, such as IEEE 802.11b. The access point is interconnected to a local-area network (LAN) or a wide-area network, such as the Internet, to guide the robot apparatus 1 into an information providing space on a network.

Robot behaviors are classified into instinctive behaviors, reflexive behaviors, conditioned-response behaviors, learning-based behaviors, learned behaviors, etc. The learning-based behaviors include memorizing a sequence of motions (i.e., planning an action), and memorizing dynamics (including the robot's body dynamics and tool-based tool dynamics, described below). Learning for the learning-based behaviors includes search-based learning, imitation-based learning, etc. The conditioned-response behaviors, the learning-based behaviors, and the learned behaviors can be implemented based on instinctive behaviors and reflexive behaviors.

A framework for integrally managing these behaviors is important to implement a behavior control system of a robot. For example, the framework determines whether the robot should "imitate" an action or whether the robot should perform a "causal behavior".

Figure 3:
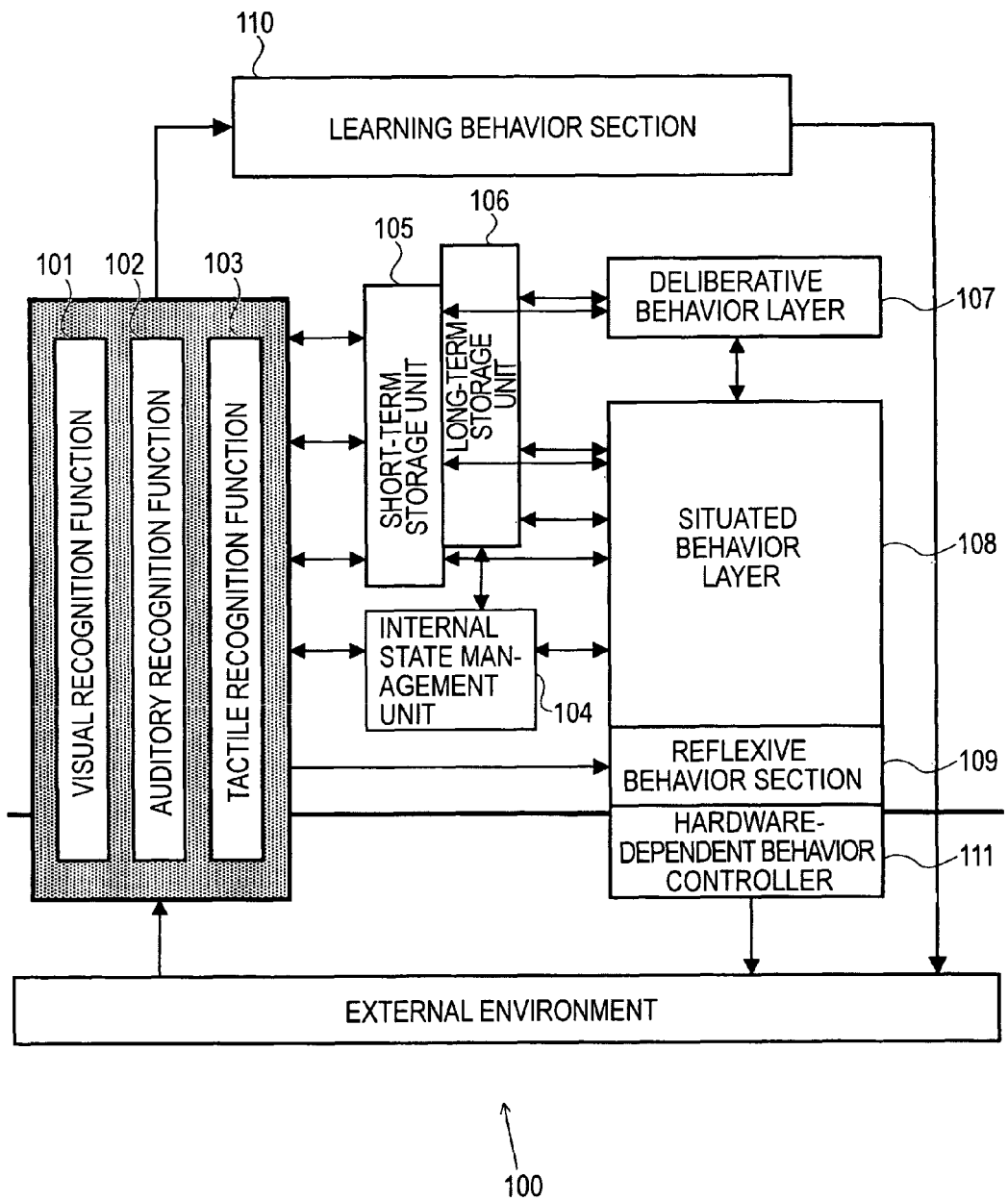
FIG. 3 is a schematic block diagram of a behavior control system of the robot apparatus according to an embodiment of the present invention.

FIG. 3 schematically shows the functional configuration of a behavior control system 100 of the robot apparatus 1 according to an embodiment of the present invention. The robot apparatus 1 performs behavior control in response to external stimuli recognized or changes in the internal state. The robot apparatus 1 has a long-term memory function for associative memory of changes in the internal state from external stimuli to perform behavior control in response to external stimuli recognized or changes in the internal state.

The behavior control system 100 shown in FIG. 3 adapts and implements object-oriented programming. Object-oriented software is handled in units of modules called "objects", and data and processing procedures therefor are integrated into each object. The objects deliver and invoke data via inter-object communication using message communication and a shared memory.

The behavior control system 100 includes a recognition section having a visual recognition function unit (video) 101, an auditory recognition function unit (audio) 102, and a tactile recognition function unit (tactile) 103 for recognizing external environments.

The visual recognition function unit 101 performs image recognition, such as face recognition and color recognition, and feature extraction based on a captured image input via an image input device, e.g., a CCD camera. The visual recognition function unit 101 is formed of a plurality of objects, such as a multi color tracker, a face detector, and a face identifying unit, described below.

The auditory recognition function unit 102 performs audio recognition on audio data input via an audio input device, e.g., a microphone, to for extract features or performs word-set (or text) recognition. The auditory recognition function unit 102 is formed of a plurality of objects, such as an audio recognition unit and a speech recognition unit, described below.

The tactile recognition function unit 103 detects a sensor signal from a tactile sensor embedded in, for example, a head of the robot body to recognize external stimuli, such as "being stroked" and "being patted".

An internal state management unit (an internal status model or ISM) 104 manages mathematical models of several emotions including instincts and feelings. The internal state management unit 104 manages internal states of the robot apparatus 1, such as instincts and emotions, in accordance with external stimuli (ES) recognized by the visual recognition function unit 101, the auditory recognition function unit 102, and the tactile recognition function unit 103.

The feeling models and the instinct models, to each of which recognition results and previous behaviors are input, manage feeling values and instinct values. The behavior models can refer to these feeling values and instinct values.

In the present embodiment, an emotion is configured by a plurality of layers depending upon the significance, and acts in each of these layers. An action is selected from the plurality of preset actions depending upon the external environment or the internal state. Although behaviors are selected in the individual layers, a lower behavior is preferentially exhibited. Thus, an instinctive behavior, e.g., reflection, and an upper behavior, e.g., selection of an action using memory, can consistently be exhibited by a single body.

In order to perform behavior control in response to external stimuli recognized or changes in the internal state, the robot apparatus 1 includes a short-term storage unit 105 for short-term memory of information that is lost over time, and a long-term storage unit 106 for long-term memory of information. The scheme for classification of memory into short-term memory and long-term memory is based on neuropsychological principles.

The short-term storage unit (short-term memory) 105 is a functional module for short-term memory of a target or event recognized from the external environment by the visual recognition function unit 101, the auditory recognition function unit 102, and the tactile recognition function unit 103. For example, the short-term storage unit 105 stores an input image from the camera 15 shown in FIG. 1 for a short period of time of approximately 15 seconds.

The long-term storage unit (long-term memory) 106 is used for long-term memory of information obtained through learning, e.g., names of articles. For example, the long-term storage unit 106 allows associative memory of changes in the internal state with respect to a behavior module from external stimuli.

Behavior control of the robot apparatus 1 according to the present embodiment is roughly classified into reflexive behavior control implemented by a reflexive behavior section 109, situated behavior control implemented by a situated behavior layer 108, deliberative behavior control implemented by a deliberative behavior layer 107, and learning behavior control implemented by a learning behavior section 110 for learning and evaluating a behavior.

The reflexive behavior section (reflexive situated behavior layer) 109 is a functional module allowing a reflexive robot motion in response to external stimuli recognized by the visual recognition function unit 101, the auditory recognition function unit 102, and the tactile recognition function unit 103.

Basically, reflexive behaviors are behaviors that directly determine a behavior to be output in response to results of recognition of external information as sensor inputs after classifying the results. For example, an action of tracking the human face and an action of nodding are preferably implemented as reflexive behaviors.

The situated behavior layer 108 controls an instinctive behavior or any other situated behavior responsive to the current conditions of the robot apparatus 1 based on the external environments stored in the short-term storage unit 105 and the long-term storage unit 106 and the internal states managed by the internal state management unit 104.

The situated behavior layer 108 provides a state machine (or a state transition model) for each behavior, and exhibits a behavior on the robot body by classifying results of recognition of external information as sensor inputs based on the previous behaviors or conditions. The situated behavior layer 108 further exhibits a behavior for keeping the internal state within a certain range (also termed a "homeostatic behavior"). If the internal state is outside of the specified range, the situated behavior layer 108 activates a behavior for moving the internal state towards the inside of the specified range so that this behavior can readily be exhibited (actually, a behavior is selected taking the internal state and the external environment into consideration). Situated behaviors have a slower response time than reflexive behaviors.

The deliberative behavior layer (deliberative layer) 107 controls relatively long-term behavior planning of the robot apparatus 1 based on the information stored in the short-term storage unit 105 and the long-term storage unit 106.

Deliberative behaviors are behaviors that are performed through inference or planning in response to given conditions or instructions given from the human. For example, searching for a route from a current robot position and a target position is one of the deliberative behaviors. Such inference and planning may require processing time and a computation load rather than the reaction time for the robot apparatus 1 to maintain an interaction (that is, a long processing time may be required). Thus, inference and planning in a deliberative behavior are performed while a reflexive behavior or a situated behavior reacts in real-time.

The deliberative behavior layer 107, the situated behavior layer 108, and the reflexive behavior section 109 may be described as hardware-independent upper application programs of the robot apparatus 1. A hardware-dependent layer controller (configuration dependent actions and reactions) 111 directly controls the hardware (external environment) of the robot body according to commands from these upper applications (or behavior modules called "schemas"). For example, the hardware-dependent layer controller ill drives a joint actuator.

The learning behavior section 110 memorizes a sequence of motions (or plans an action) or memorizes dynamics (including the robot's body dynamics and tool-based tool dynamics, described below), and performs search-based learning, imitation-based learning, or the like.

Figure 4:
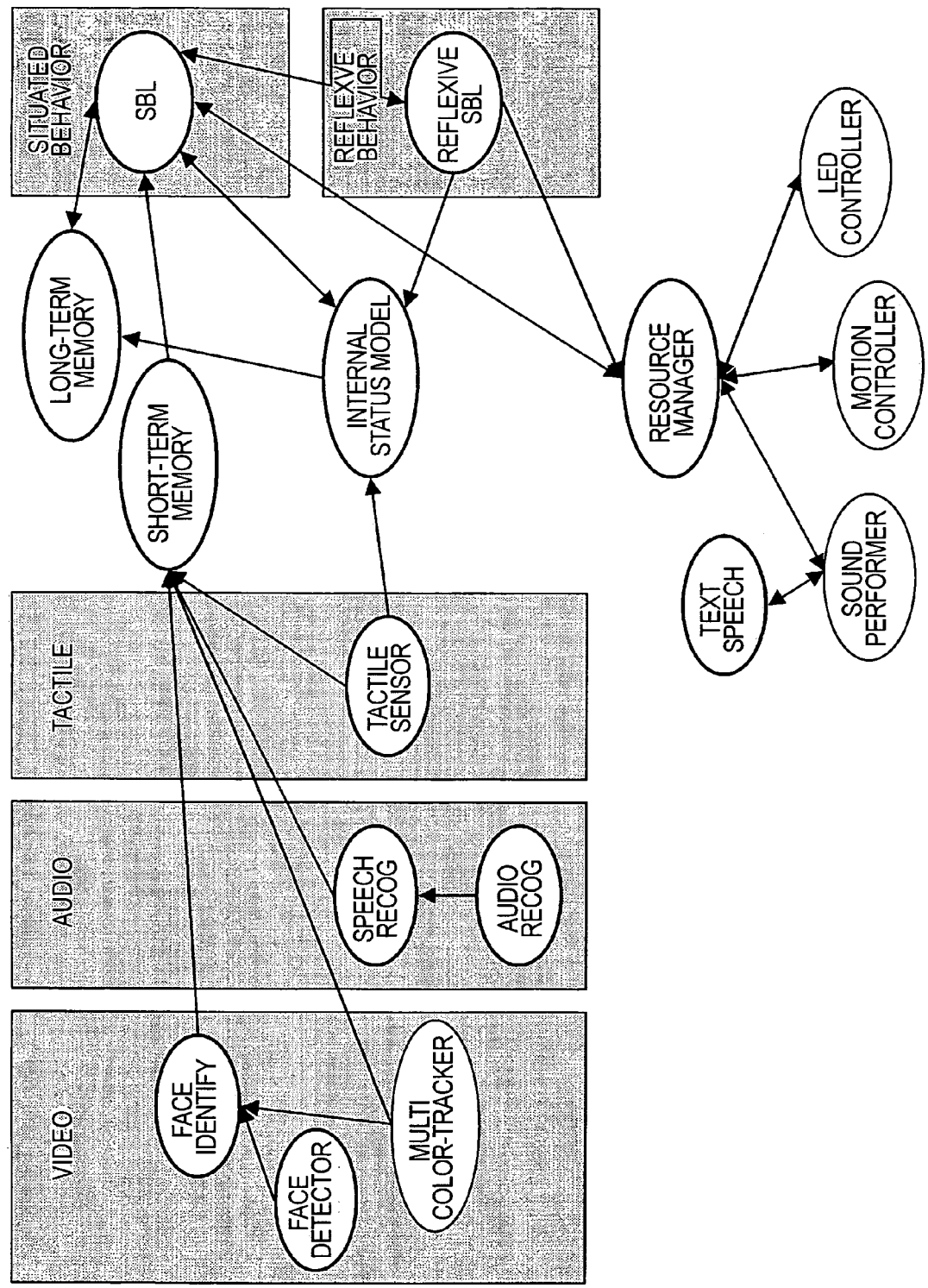
FIG. 4 is a schematic diagram of objects in the behavior control system.

The functional modules in the behavior control system 100 of the robot apparatus 1 shown in FIG. 3 are configured by objects. The objects deliver and invoke data via inter-object communication using message communication and a shared memory. FIG. 4 schematically shows the object configuration of the behavior control system 100 according to the present embodiment.

The visual recognition function unit 101 is formed of three objects: a face detector, a multi color tracker, and a face identifying unit.

The face detector detects a face area from a picture frame, and outputs the detected face area to the face identifying unit. The multi color tracker performs color recognition, and outputs a recognition result to the face identifying unit and a short-term memory (STM) that is an object forming the short-term storage unit 105. The face identifying unit searches for the detected face picture using, for example, a biographical dictionary to identify a person, and outputs identification (ID) information of the person to the STM together with position and size information of the face picture area.

The auditory recognition function unit 102 is formed of two objects: an audio recognition unit and a speech recognition unit. The audio recognition unit receives audio data from an audio input device, such as a microphone, to extract features and to detect an audio domain, and outputs a feature value of the audio data in the audio domain and the direction of the sound source to the speech recognition unit and the STM. The speech recognition unit performs speech recognition using the feature value of the audio data received from the audio recognition unit, a speech dictionary, and a syntax dictionary, and outputs a recognized set of words to the STM.

The tactile recognition function unit 103 is formed of an object named a tactile sensor for recognizing sensor input from the tactile sensor. The tactile sensor outputs the recognized sensor information to the STM and an internal state model (ISM) that is an object for managing internal states.

The STM is an object forming the short-term storage unit 105, and is a functional module for storing a target or an event recognized from the external environment by the objects in the recognition section. For example, the STM stores an input image from the camera 15 for a short period of time of approximately 15 seconds. The STM constantly notifies a situated behavior layer (SBL), which is an STM client, of external stimuli.

A long-term memory (LTM) is an object forming the long-term storage unit 106, and is used to store information acquired through learning, e.g., names of articles, for a long period of time. For example, the LTM allows associative storage of changes in the internal state with respect to a behavior module from external stimuli.

The ISM is an object forming the internal state management unit 104 for managing mathematical models of several emotions including instincts and feelings. The ISM manages internal states of the robot apparatus 1, such as instincts and emotions, in accordance with external stimuli (ES) recognized by the objects in the recognition section.

The SBL is an object forming the situated behavior layer 108. The SBL is a client of the STM (or an STM client), and determines a schema, or a behavior module to be executed, in response to external stimuli (namely, a target or an event) information constantly sent from the STM.

A reflexive situated behavior layer (reflexive SBL) is an object forming the reflective behavior section 109 for performing a reflexive direct robot motion in response to external stimuli recognized by the objects in the recognition section. For example, the reflexive SBL allows the robot apparatus 1 to perform an action of tracking the human face, nodding, or avoiding a detected obstacle.

The SBL selects a behavior depending upon the situation in response to external stimuli or changes in the internal state. On the other hand, the reflexive SBL selects a reflexive behavior in response to external stimuli. These two objects independently select behaviors, and therefore the behavior modules (schemas) selected by these objects may not be implemented on the robot body due to a conflict between hardware resources of the robot apparatus 1. An object named a resource manager arbitrates the hardware conflict caused by the behaviors selected by the SBL and the reflexive SBL. The resource manager sends a result of arbitration to objects for realizing motions of the robot body, and the motions of the robot body are therefore performed.

A sound performer, a motion controller, and an LED controller are objects for realizing a robot motion. The sound performer is an object for outputting sound. The sound performer synthesizes sounds according to a text command given from the SBL via the resource manager, and outputs sound from the loudspeaker 17 of the robot apparatus 1. The motion controller is an object for driving joint actuators of the robot body. In response to a command for movement of a hand or leg from the SBL via the resource manager, the motion controller calculates the joint angle necessary for the movement. The LED controller is an object for controlling the on/off operation of the LED 19, and allows the LED 19 to be turned on and off in response to a command from the SBL via the resource manager.

The robot apparatus 1 according to the present embodiment controls an instinctive behavior or any other situated behavior responsive to conditions based on the external environment and the internal state.

Figure 5:
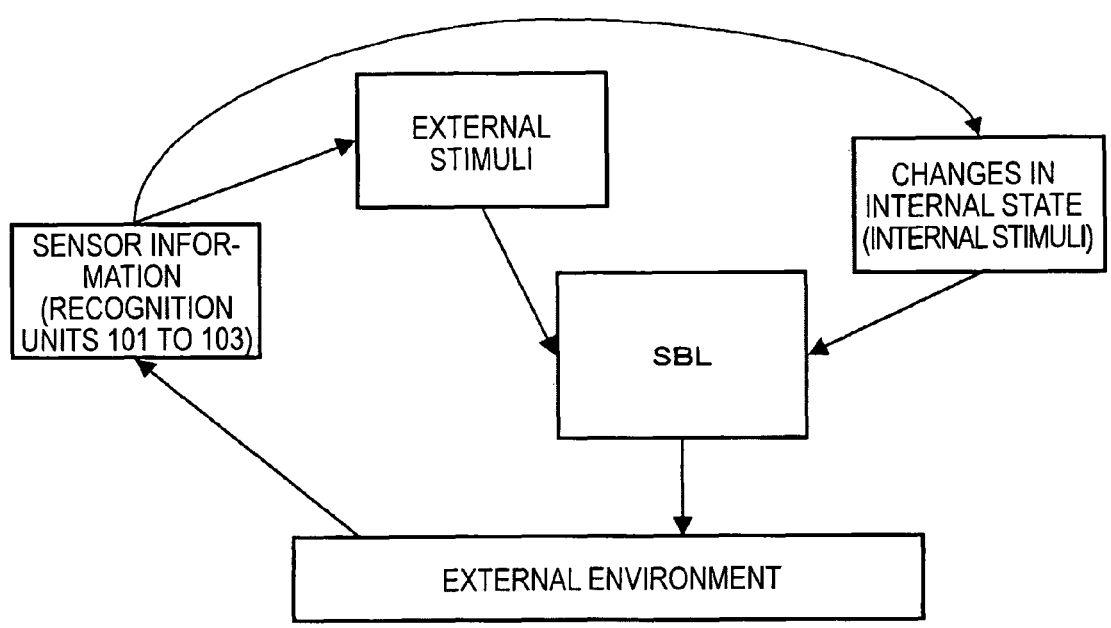
FIG. 5 is a schematic transition diagram of situated behavior control performed by a situated behavior layer (SBL) (and a reflexive behavior section)

FIG. 5 schematically shows situated behavior control performed by the situated behavior layer (or the SBL) 108 (and the reflexive behavior section 109). The external environment recognized by the recognition section (i.e., the visual recognition function unit 101, the auditory recognition function unit 102, and the tactile recognition function unit 103) is supplied to the situated behavior layer 108 (and the reflexive behavior section 109) as external stimuli. Changes in the internal state along with the external environment recognized by the recognition section are also supplied to the situated behavior layer 108. The situated behavior layer 108 selects a behavior depending upon the situation in response to the external stimuli and the changes in the internal state.

The situated behavior layer 108 provides a state machine for each behavior module, and exhibits a behavior on the robot body by classifying results of recognition of external information as sensor inputs based on the previous behaviors or conditions. Each behavior module is described as a schema having an action function for defining a robot motion and implementing a state transition (or state machine) involved with execution of the behavior, and a monitor function for evaluating a behavior executed according to the definition of the action function based on the external stimuli or the internal state to determine the situation.

Figure 6:
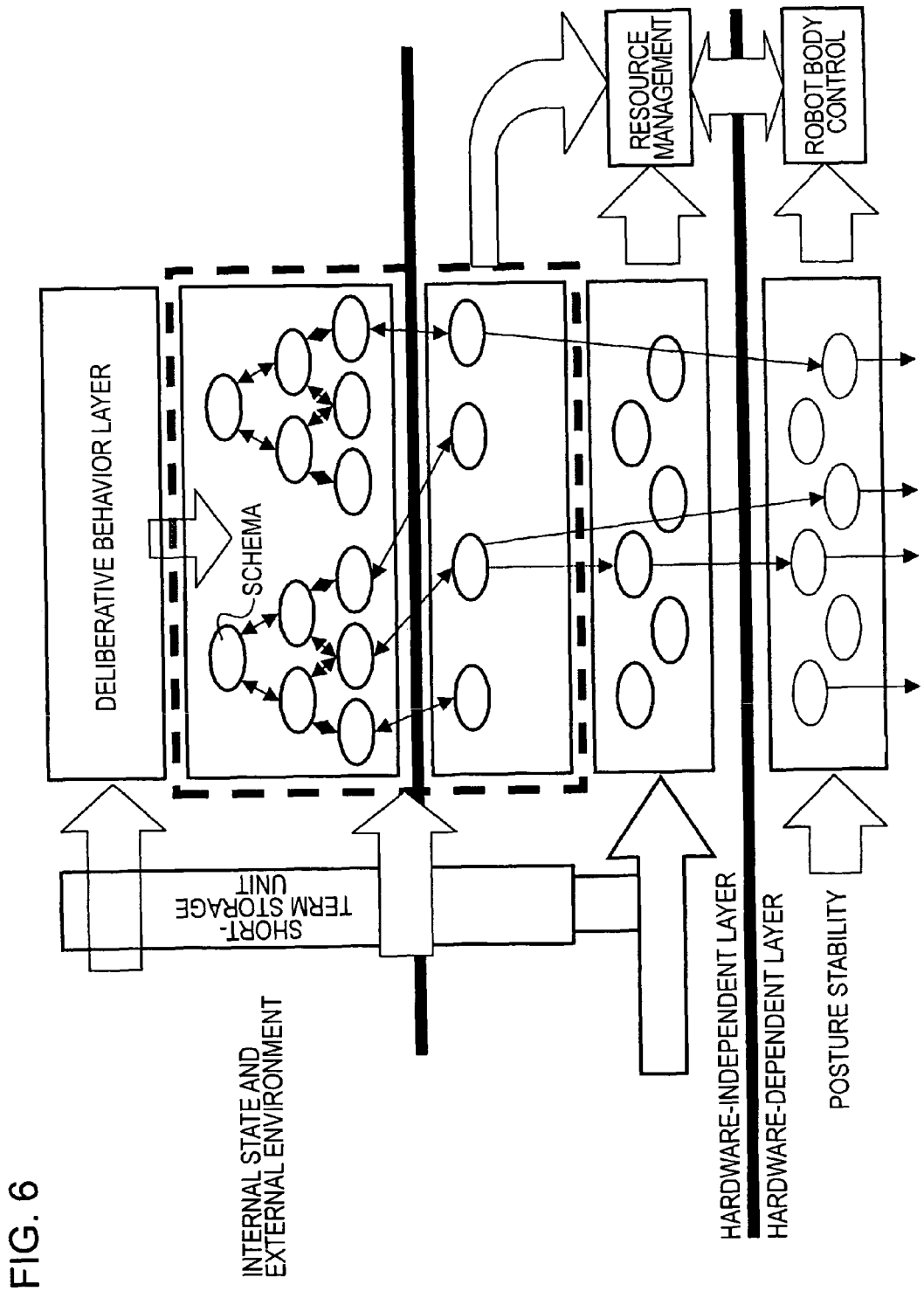
FIG. 6 is a schematic diagram of the situated behavior layer that includes a plurality of schemas.

FIG. 6 schematically shows the situated behavior layer 108 that includes a plurality of schemas.

The situated behavior layer 108 (more specifically, a layer in the situated behavior layer 108 for controlling ordinary situated behaviors) has a tree structure in which a plurality of schemas are hierarchically connected with each other, and is configured to perform behavior control by determining an optimum schema in response to external stimuli and changes in the internal state. The tree structure includes a plurality of sub-trees or branches, such as sub-trees for executing behavior models by which ethological situated behaviors are mathematically represented, and sub-trees for expressing feelings.

Figure 7:
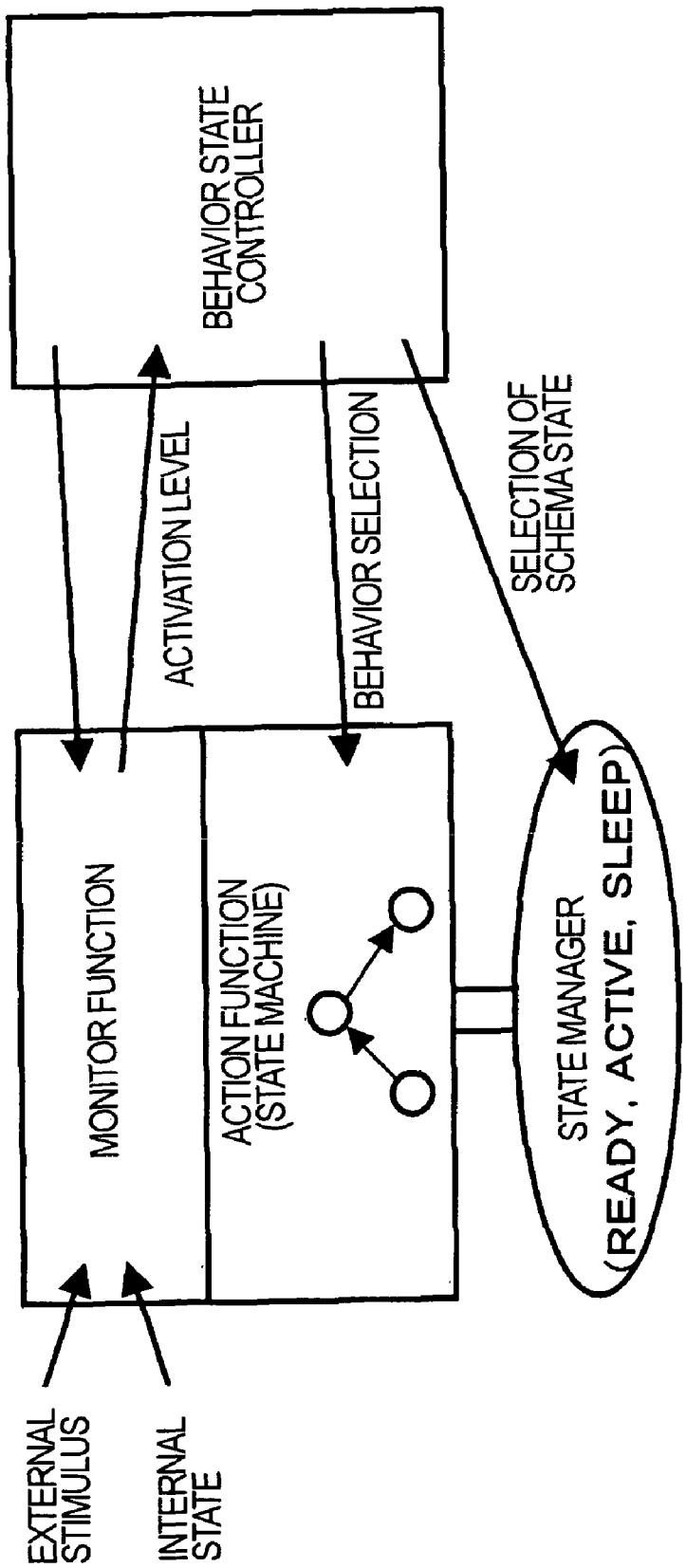
FIG. 7 is a schematic internal configuration diagram of each schema.

External stimuli and internal states are input to each of the schemas. Each schema includes at least a Monitor function and an Action function. FIG. 7 schematically shows the internal configuration of each schema. As shown in FIG. 7, each schema includes an Action function that defines a robot motion in the form of a state transition model (state machine) in which the state transitions along with the occurrence of predetermined events, a Monitor function that evaluates each state defined by the Action function based on the external stimuli and the internal state and that returns an evaluation result as an activation level value, and a state manager that stores and manages the state of the schema by setting the state machine of the Action function to READY, ACTIVE, or SLEEP.

The Monitor function is a function by which an activation level (AL) value of this schema is calculated based on the external stimuli and the internal state. In the tree structure shown in FIG. 6, an upper (parent) schema calls the Monitor function of a lower (child) schema using the external stimuli and the internal state as the argument, and the child schema returns its AL value to the parent schema. Each schema calls the Monitor function of a child schema to calculate the AL value of this schema. The root schema receives the AL values of the sub-trees, and therefore determines an optimum schema or behavior responsive to the external stimuli and the changes in the internal state from comprehensive points of view.

For example, the schema having the highest AL value may be selected, or two or more schemas having AL values higher than a predetermined threshold may be selected to perform behaviors in parallel. In the latter case, however, there should not be a conflict between hardware resources of the schemas.

In the example shown in FIG. 7, a behavior state controller operable to manage the schemas or behavior modules selects a behavior to be performed based on the AL value returned from the Monitor function, and calls the Action function of the corresponding schema or instructs state transition of the schema between the states stored in the state manager. For example, the behavior state controller selects the schema having the highest activation level indicating the highest behavior induction evaluation, or selects a plurality of schemas according to a priority order so that no conflict occurs between resources. The behavior state controller also controls the state of the schemas. For example, if schemas with higher priority are activated and conflict occurs between resources, the behavior state controller places the state of a lower priority schema from ACTIVE into SLEEP, and then returns the state to ACTIVE when the conflict is resolved.

In the robot behavior control system 100 according to the present embodiment, the situated behavior layer 108 determines a behavior based on the internal state and the external environment.

The internal states of the robot apparatus 1 include several emotions, such as instincts and feelings, and are mathematically modeled. The internal state management unit (i.e., the internal status model or ISM) 104 manages the internal state based on external stimuli (ES) recognized by the recognition function units 101 to 103 over time.

Figure 8:
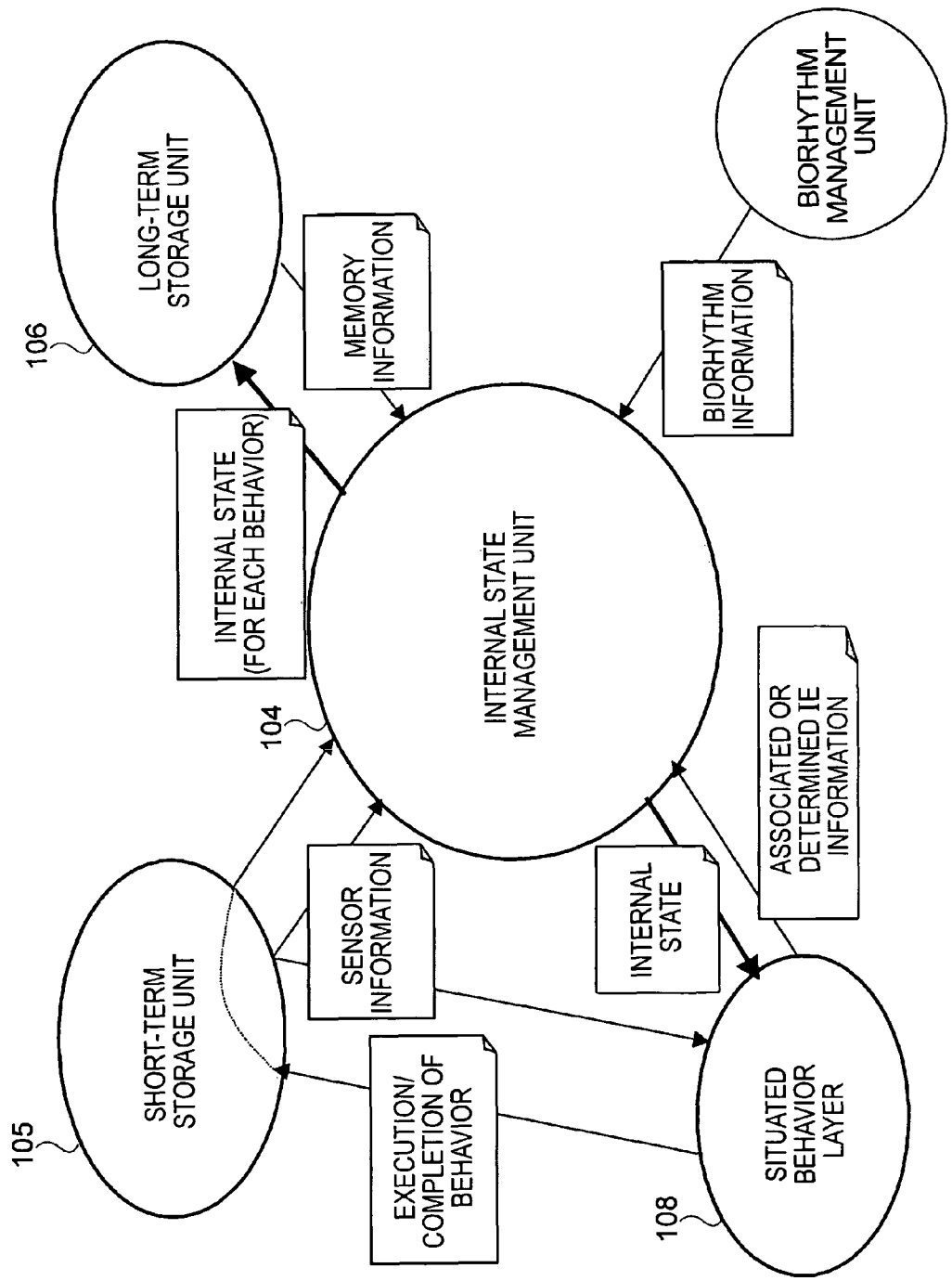
FIG. 8 is a schematic diagram of communication paths between an internal state management unit and other functional modules.

FIG. 8 schematically shows communication paths between the internal state management unit 104 and other functional modules.

The short-term storage unit 105 outputs recognition results from the recognition function units 101 to 103 that recognize changes in the external environment to the internal state management unit 104 and the situated behavior layer 108. The internal state management unit 104 notifies the situated behavior layer 108 of an internal state. Then, the situated behavior layer 108 returns associated or determined instinct or emotion (IE) information.

The situated behavior layer 108 selects a behavior based on an activation level determined based on the internal state and the external environment, and notifies the internal state management unit 104 of execution and completion of the selected behavior via the short-term storage unit 105.

The internal state management unit 104 outputs an internal state for each behavior to the long-term storage unit 106. The long-term storage unit 106 returns memory information to the internal state management unit 104.

A biorhythm management unit supplies biorhythm information to the internal state management unit 104.

Index values of internal states change over time. Primary emotions, or instincts, e.g., "hunger", "fatigue", and "sleep", change over time as follows:

Hunger: getting hungry (indicated by a virtual value or the remaining battery capacity)

Fatigue: feeling fatigue

Sleep: feeling sleepy

In the present embodiment, secondary robot emotions, or feelings (Emotion), include "pleasantness (happiness)", "activation (activity)", and "certainty (degree of confidence)". These emotions change over time as follows:

Pleasantness: changing to neutral

Activation: changing depending upon the biorhythm and the degree of sleep

Certainty: changing depending upon attention

The internal states may also change during robot motion. For example, a schema for a "sleeping" behavior aims at a behavior for satisfying the desire to sleep, which is a lower primary emotion. The situated behavior layer 108 calculates and compares the activation level values of the schemas based on the primary emotion "sleep" and the secondary emotion "activation" to select the "sleep" schema. The sleeping behavior is thus realized.

The situated behavior layer 108 further transmits completion of the sleeping behavior to the internal state management unit 104 via the short-term storage unit 105. The internal state management unit 104 changes the index value of the primary emotion "sleep" as a result of execution of the sleeping behavior.

Then, the situated behavior layer 108 calculates and compares the activation level values of the schemas again based on the degree of satisfying the desire to sleep and the secondary emotion "activation". As a result, another schema having high priority is selected, and the "sleep" schema is released.

The internal states may also change depending upon the sensor information obtained during robot motion.

The progress of robot motion is recognized by the recognition function units 101 to 103, and is transmitted to the internal state management unit 104 via the short-term storage unit 105. The internal state management unit 104 may reflect the motion progress as, e.g., fatigue, a change in the primary emotion. The secondary emotions may also change along with the change in the primary emotion.

It is advantageous to realize self-development and behavior emergence of a robot apparatus using an imitation mechanism.

There has been research and development on robot apparatuses using imitation and gesture recognition. While robot apparatuses are capable of imitating each other or recognizing gestures, the ability to directly imitate human beings or caregivers allows more efficient learning and self-development of the robot apparatuses, and accelerates the advancement of the robot apparatuses.

A human imitation mechanism is realized with solutions to robotics problems, e.g., why robots imitate human beings (i.e., motivation), how to select and realize an appropriate motion in light of its different degree of flexibility from a human body.

In the field of sound imitation, there are problems in that a phoneme may be pronounced with different frequency characteristics by a caregiver and a robot apparatus and may also be pronounced in different manners depending upon the caregiver. The same phonemes may be pronounced with different characteristics by human beings because of different internal states depending upon the situation, such as feelings, or individual body constraints. It may be impossible to provide a robot apparatus capable of imitating the human voice.

A mechanism for a robot to learn a phoneme sequence based on the human voice will now be described. This sound imitation mechanism allows the robot to learn only a significant phoneme sequence in light of individuality of body constraints.

Figure 9:
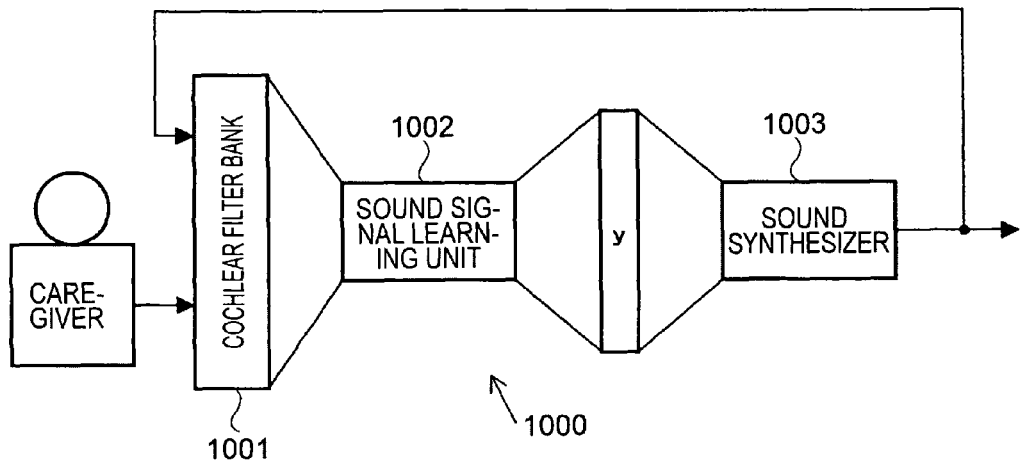
FIG. 9 is a schematic diagram of a sound imitation system according to an embodiment of the present invention.

FIG. 9 schematically shows the configuration of a sound imitation system 1000 according to an embodiment of the present invention. The sound imitation system 1000 includes a cochlear filter bank 1001, a sound signal learning unit 1002, and a sound synthesizer 1003.

The cochlear filter bank 1001 is a functional module for differentiating a phoneme sequence pronounced by a speaker from that by another speaker using a characteristic that each phoneme is composed of a plurality of components whose center frequencies are multiples of a reference frequency. In the following description, the cochlear filter bank 1001 is represented by a function K for converting input phoneme sequences s and s' pronounced by different speakers into a sequence u in which the difference between the phoneme sequences s and s' is identified. The cochlear filter bank 1001 may be incorporated in the DSP of the microphone 16 described above.

A cochlear filter bank is a model of the functioning of the cochlea located in the inner ear in the human auditory periphery, which was proposed by J. M. Kates in IEEE Transactions on Signal Processing, Vol. 39, No. 12, December 1991, and IEEE Transactions on Speech and Audio Processing, Vol. 1, No. 4, October 1993. It is said that the cochlea has a frequency analysis function. In the present embodiment, a filter bank in a digital cochlear model is used for sound frequency analysis.

The sound signal learning unit 1002 is a functional module for evaluating and learning a relationship between a sound synthesis parameter y of an input sound signal and a sound synthesis parameter $y_o$ that is generated by the robot apparatus by imitating the input sound signal y. In the following description, the sound signal learning unit 1002 is represented by an evaluation function H of learning by which the parameter y is converted into the parameter $y_o$. The phoneme sequence u is input to the evaluation function H, and is then converted into the sound synthesis parameter y. The learning mechanism may employ a feed-forward neural network. The sound signal learning unit 1002 may be incorporated in, for example, the speech recognition unit, which is an object in the recognition section, described above.

The sound synthesizer 1003 is a functional module for synthesizing a sound signal s to be output based on the input sound synthesis parameter y. In the following description, the sound synthesizer 1003 is represented by a function G to which the parameter y is input and from which the signal s is output. The sound synthesizer 1003 may be incorporated in, for example, the sound performer in the output section, described above.

The mechanism for sound imitation performed by the system shown in FIG. 9 is defined as follows:
(1) y→G→s
(2) s→K→u
(3) u→H→$y_o$ The sound synthesis parameter y, which is a basic phoneme sequence element, is introduced into the sound synthesis function G, and a phoneme sequence formed of the sound signal s is output. When the phoneme sequence s is input to the cochlear filter bank 1001, the phoneme sequence s is converted by the filter function K into a phoneme sequence u in which speaker individuality is reflected. The learning function H representing the sound signal learning unit 1002 generates a sound synthesis parameter $y_o$ used for sound imitation from the phoneme sequence u. The sound synthesis parameter $y_o$ is introduced into the sound synthesis function G, and a phoneme sequence acquired by sound imitation is generated.

The learning function H representing the sound signal learning unit 1002 evaluates the difference between the sound synthesis parameter y input to the behavior control system and the sound synthesis parameter $y_o$ used for sound imitation, and performs learning.

A phoneme may be pronounced with different characteristics by human beings in response to the internal state, such as the feeling, depending upon the situation, or due to individual body constraints. However, the system configuration shown in FIG. 9 does not take such individual body constraints into consideration.

Figure 10:
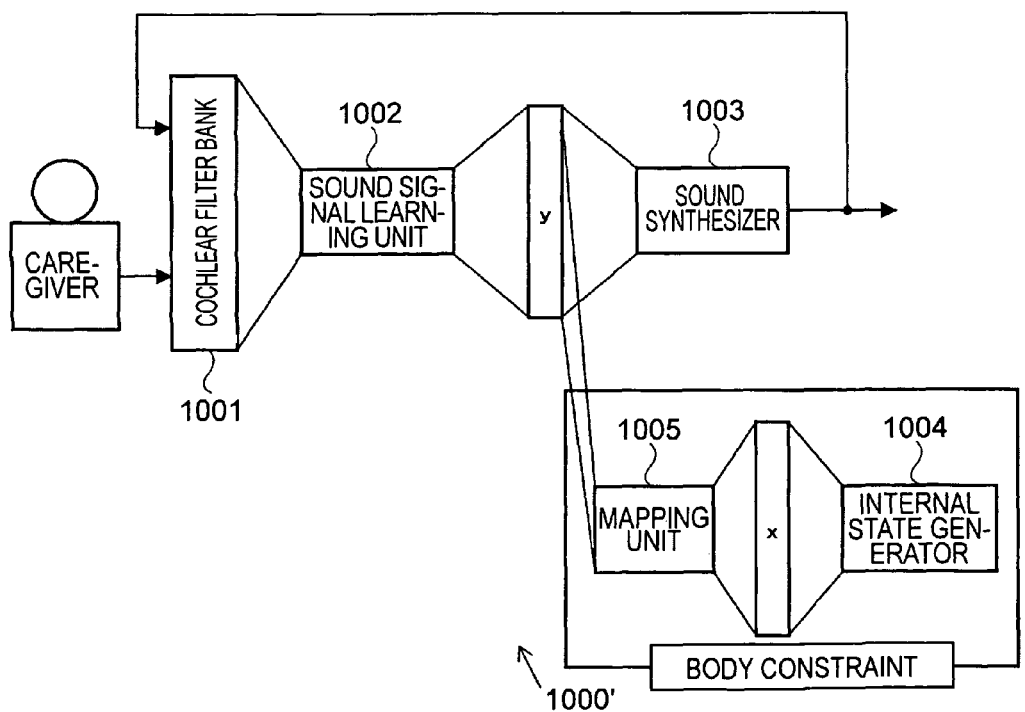
FIG. 10 is a schematic diagram of a sound imitation system according to another embodiment of the present invention.

FIG. 10 schematically shows the configuration of a sound imitation system 1000' for determining the internal state in view of individual body constraints. The sound imitation system 1000' includes a cochlear filter bank 1001, a sound signal learning unit 1002, a sound synthesizer 1003, an internal state generator 1004, and a mapping unit 1005.

The cochlear filter bank 1001 is a functional module for differentiating a phoneme sequence pronounced by a speaker from that by another speaker using a characteristic that each phoneme is composed of a plurality of components whose center frequencies are multiples of a reference frequency. The cochlear filter bank 1001 is represented by a function K.

The sound signal learning unit 1002 is a functional module for evaluating and learning a relationship between a sound synthesis parameter y of an input sound signal and a sound synthesis parameter $y_o$ that is generated by the robot apparatus by imitating the input sound signal y. The sound signal learning unit 1002 is represented by an evaluation function H.

The sound synthesizer 1003 is a functional module for synthesizing a sound signal s to be output based on the input sound synthesis parameter y. The sound synthesizer 1003 is represented by a function G.

The internal state generator 1004 generates a current internal state x that is formed of a breath signal, a body stretch signal, etc.

The mapping unit 1005 maps the current internal state x to the sound synthesis parameter y. In the following description, the mapping unit 1005 is represented by a function F by which the input internal state x is converted into the sound synthesis parameter y.

In the sound imitation system 1000' shown in FIG. 10, a mechanism for determining the internal state from the robot's voice is defined as follows:
(1) x→F→y
(2) y→G→s (3) s→K→u (4) u→H→$y_o$ The internal state generator 1004 generates an internal state x, and the mapping unit 1005 converts the internal state x into a sound synthesis parameter y for generating a phoneme sequence indicating the internal state x. The sound synthesis parameter y is introduced into the sound synthesis function G, and a phoneme sequence formed of the sound signal s is output. When the phoneme sequence s is input to the cochlear filter bank 1001, the phoneme sequence s is converted by the filter function K into a phoneme sequence u in which speaker individuality is reflected. The learning function H representing the sound signal learning unit 1002 generates a sound synthesis parameter $y_o$ used for sound imitation from the phoneme sequence u. The sound synthesis parameter $y_o$ is introduced into the sound synthesis function G, and a phoneme sequence acquired by sound imitation is generated. In the mathematical expressions described above, the expressions (2) to (4) constitute the sound imitation mechanism described above.

The sound imitation system 1000' shown in FIG. 10 allows self-analysis and learning (predictive error or correlation learning) of input vocal sounds produced at random. When the robot apparatus produces the same sound as a sound significant to the human, it can analyze and learn it. Therefore, a learning mechanism using a combination of individuality-reflected learning and learning with vocal reinforcement can be achieved.

This learning mechanism allows the robot apparatus to learn which parameter in the robot's voice the voice detected through the auditory sense corresponds to. The robot apparatus can therefore learn a significant sound.

In the sound imitation system 1000' shown in FIG. 10, a mechanism for determining the internal state from a caregiver's voice is defined as follows:

(1) s'→F→u'

(2) u'→H→$y_o$'

(3) $y_o$'→y'

(4) y'→G→s (5) y'→$F^{-1}$→x'

When a phoneme sequence s' pronounced by a caregiver is input to the cochlear filter bank 1001, the phoneme sequence s' is converted by the filter function K into a phoneme sequence u' in which speaker individuality is reflected. The learning function H representing the sound signal learning unit 1002 generates a sound synthesis parameter $y_o$' used for sound imitation from the phoneme sequence u'.

The learning function H representing the sound signal learning unit 1002 evaluates the difference between the sound synthesis parameter y' based on the phoneme sequence s' of the caregiver and the sound synthesis parameter $y_o$' used for sound imitation, and performs learning.

The sound synthesis parameter y' is introduced into the sound synthesis function G, and a phoneme sequence s that is acquired by imitating the phoneme sequence of the caregiver is output.

The mapping unit 1005 derives an internal state x' from the sound synthesis parameter y' using an inverse function $F^{-1}$. This means that the internal state is inversely estimated. This inverse estimation determines the robot body. That is, when human voice is detected, the robot apparatus can determine its internal state using inverse mapping.

Learning is the process of acquiring knowledge or skills in activities, and is an important function for a robot apparatus to realize self-development.

The learning-based behaviors of robot apparatuses include memorizing a sequence of motions (i.e., planning an action), and memorizing dynamics (including the robot's body dynamics and tool-based tool dynamics, described below). Learning for the learning-based behaviors includes search-based learning and imitation-based learning. The condition-response behaviors, the learning-based behaviors, and the learned behaviors can be implemented based on instinctive and reflexive behaviors.

A robot apparatus according to an embodiment of the present invention learns dynamics including environments (or external stimuli) and internal states of the robot apparatus, and uses the learned dynamics for prediction to determine a command sequence. Thus, a predictive learning behavior system is realized.

Figure 11:
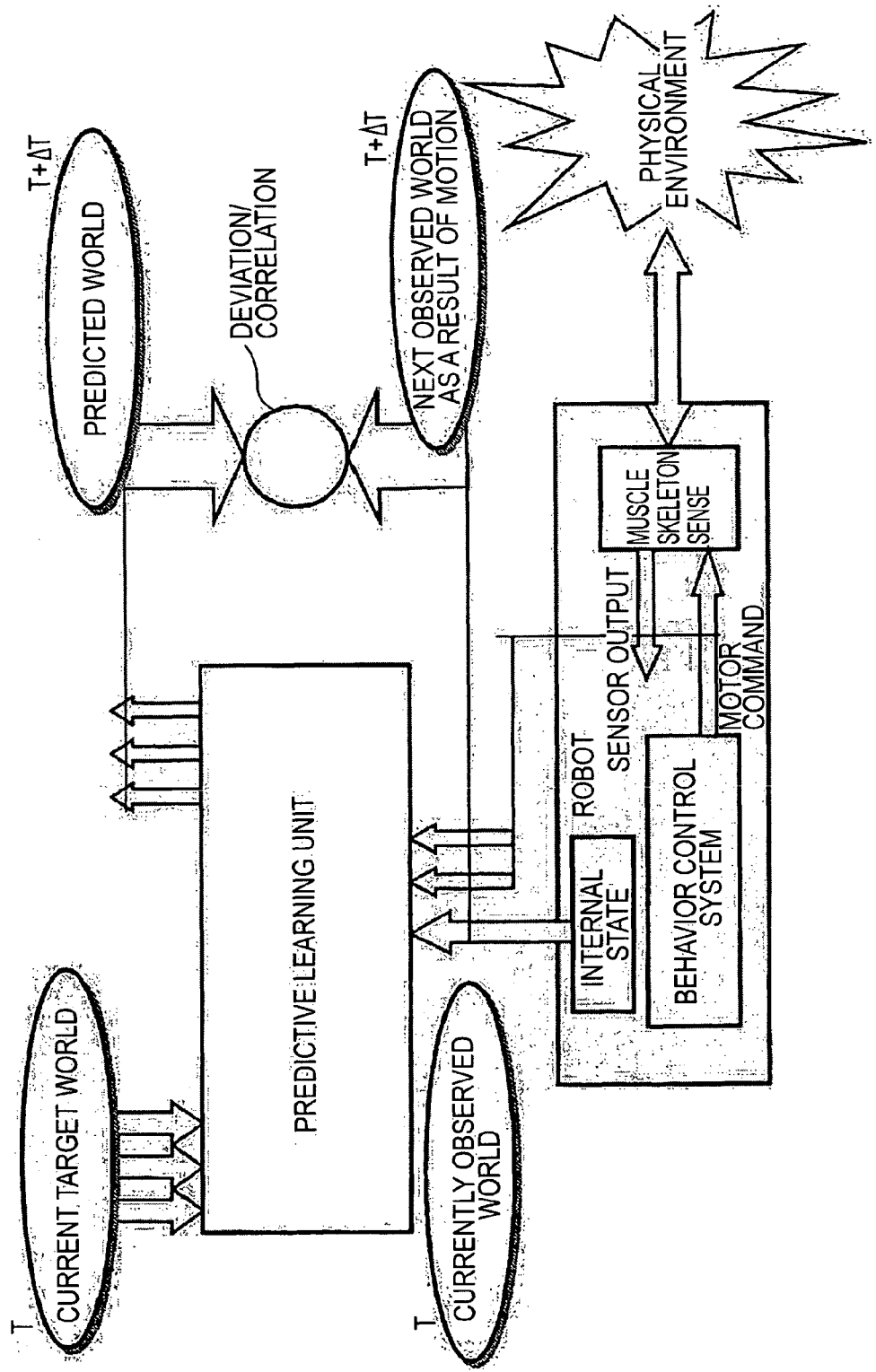
FIG. 11 is a schematic system configuration diagram of a predictive learning unit incorporated in a robot apparatus according to an embodiment of the present invention.

FIG. 11 schematically shows the system configuration of a predictive learning unit incorporated in a robot apparatus according to an embodiment of the present invention.

The robot apparatus, or a real robot, includes actuators and frames serving as muscles and skeletons of a human being or any other animal after which the robot is modeled, and sensors serving as the senses for detecting external stimuli. A behavior control system of the robot apparatus keeps a current internal state, and determines a behavior to be exhibited in response to the internal state and the external environment recognized by the sensors (see, for example, FIGS. 3 and 5). Such behavior control is represented in the form of motor commands for the robot.

The predictive learning unit is surrounded by four worlds: a currently observed world, a current target world, a predicted world, and a next observed world as a result of motion of the robot.

Each world is represented by parameters indicating an internal state of the robot apparatus, a motor command controlling a behavior of the robot apparatus, and an external environment detected by the sensors during execution of the behavior. In other words, the predictive learning unit determines these worlds based on these parameters (i.e., internal states, motor commands, and sensor outputs) of the individual worlds.

In predictive learning, typically, a next observed (predicted) value is estimated based on a current observed value, and a next observed value is actually measured. Based on deviation or correlation between the predicted value and the next observed value, predictive learning is performed to determine a command sequence. The predictive learning unit according to the present embodiment has a feature that a current target value in addition to a current observed value is input to the predictive learning unit. The predictive learning unit performs learning and evaluation based on a target world, or the current target value, and a currently observed world, or the current observed value. The predictive learning unit may be formed of a feed-forward neural network or a recurrent neural network, or may be formed of a correlation learning unit.

A learning process performed by the predictive learning unit according to an embodiment of the present invention will be described with reference to FIG. 12.

Figure 12:
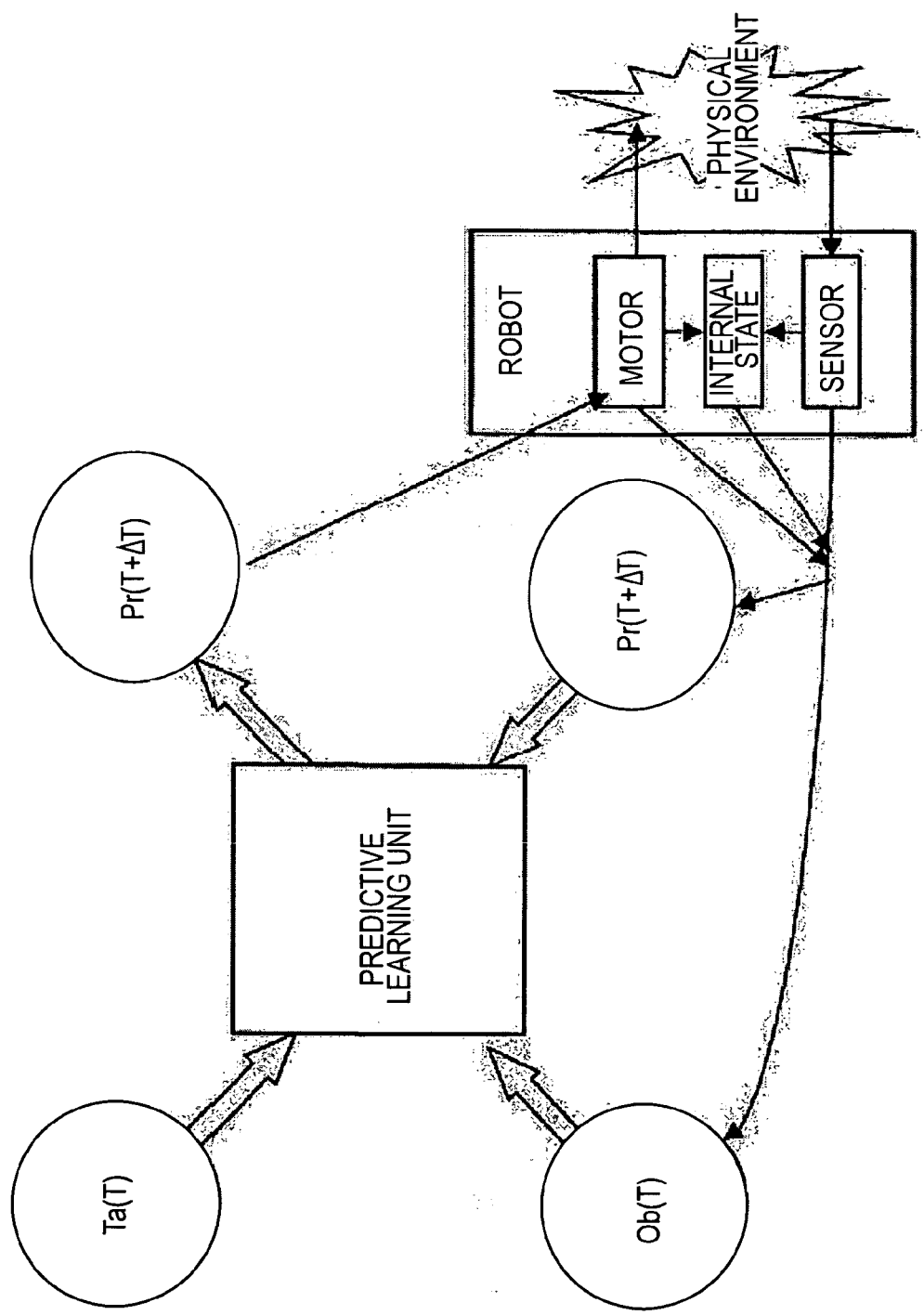
FIG. 12 is a diagram showing a learning process performed by the predictive learning unit.

In FIG. 12, a real robot corresponding to an actual robot apparatus includes a motor for driving the overall muscular and skeletal systems, internal states including feelings and emotions, and a sensor for measuring the physical environment of the robot as external stimuli. The motor is activated in response to a motor command supplied from a behavior control system or the like. The sensor detects a physical environment when the motor command is executed or when the robot performs a motion. The internal states change along with movements driven by the motor and the physical environment detected by the sensor (see FIG. 8).

At current time T, the robot executes an input motor command, and inputs a current observed value Ob(T) to the predictive learning unit. The current observed value Ob(T) includes results (e.g., a joint angle, a motor torque, etc.) of activation of the motor, a sensor output indicating a measured physical environment or external stimulus, and an internal state that changes based on the results of activation of the motor and the sensor output.

A target value generator (not shown) generates a target value Ta(T) at current time T, and inputs it to the predictive learning unit. The target value Ta(T) includes results of activation of the motor, a sensor output, and an internal state.

The predictive learning unit estimates a predicted value Pr(T+$\Delta$T) indicating results of activation of the motor, a sensor output, and an internal state, which are predicted at next time T+$\Delta$T. This estimation may be performed using feed-forward or recurrent neural network learning or correlation learning.

In the robot, a behavior to be executed at next time T+$\Delta$T, i.e., a motor command, is generated based on the behavior control described above in response to the external environment and the internal state, and a next observed value Ob(T+$\Delta$T) that is observed at next time T+$\Delta$T as a result of the behavior is input to the predictive learning unit. The next observed value Ob(T+$\Delta$T) includes results of activation of the motor, a sensor output indicating a measured physical environment or external stimulus, and an internal state that changes based on the results of activation of the motor and the sensor output.

The predictive learning unit performs predictive learning based on the predicted value Pr(T+$\Delta$T) and the next observed value Ob(T+$\Delta$T). For example, the predictive learning unit performs learning based on deviation or correlation between the predicted value Pr(T+$\Delta$T) and the next observed value Ob(T+$\Delta$T).

The target value generator may generate a target value Ta(T) based on a user input, or may generate a target value Ta(T) depending upon the situation in response to the internal state of the robot apparatus and the external environment.

The robot apparatus according to the present embodiment implements not only the robot's body dynamics but also tool-based tool dynamics. The robot apparatus implements the tool-based tool dynamics using a tool-based interaction with the external environment.

Figure 13:
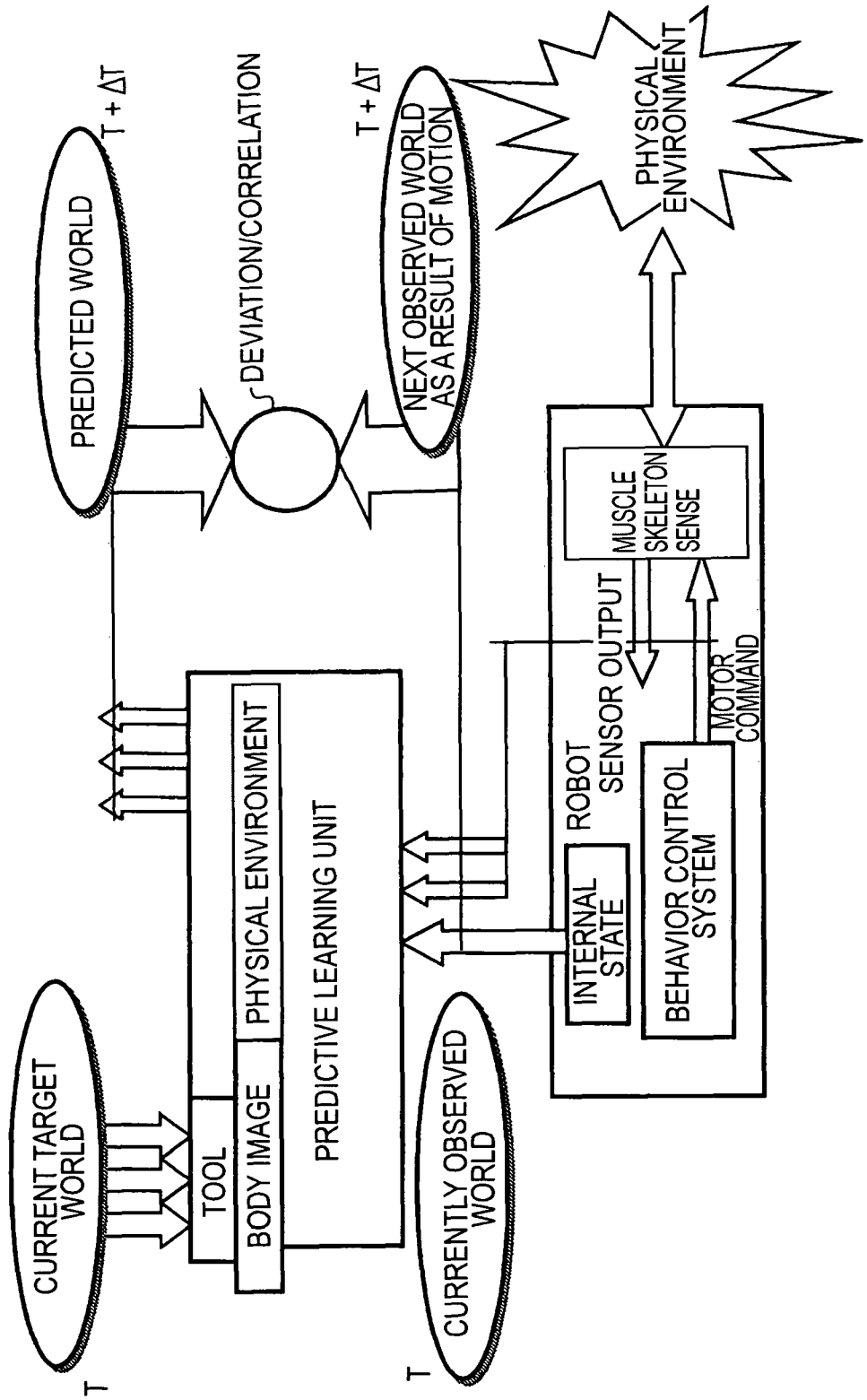
FIG. 13 is a schematic system configuration diagram of a predictive learning unit for allowing a robot apparatus to learn tool-based tool dynamics.

FIG. 13 schematically shows the system configuration of a predictive learning unit for allowing the robot apparatus to learn tool-based tool dynamics. The predictive learning unit shown in FIG. 13 learns tool dynamics with the same framework as the system configuration shown in FIG. 11, and uses the learned tool dynamics as a "tool".

In the configuration shown in FIG. 11, the predictive learning unit uses results (e.g., a joint angle, a motor torque, etc.) of activation of the motor when the robot executes a motor command, a sensor output indicating a measured physical environment, and an internal state.

In the system configuration shown in FIG. 13, on the other hand, the predictive learning unit uses a tool that is used to manipulate the physical environment, a body image that is obtained by manipulating the physical environment using the tool, and the physical environment. Thus, a model of the tool is learned in the predictive learning unit. The tool used by the robot is determined by the motor command and the sensor output.

At current time T, the robot executes an input motor command, and inputs a current observed value Ob(T) to the predictive learning unit. The current observed value Ob(T) includes a body image indicating results (e.g., a joint angle, a motor torque, etc.) of an interaction using a tool, the used tool, and a physical environment indicated by a sensor output.

A target value generator (not shown) generates a target value Ta(T) at current time T, including a body image, a used tool, and a physical environment, and inputs the target value Ta(T) to the predictive learning unit.

The predictive learning unit estimates a predicted value Pr(T+$\Delta$T) predicted at next time T+$\Delta$T, indicating a body image, a used tool, and a physical environment. This estimation may be performed using feed-forward neural network learning or correlation learning.

In the robot, a behavior to be executed at next time T+$\Delta$T is generated based on the behavior control described above in response to the external environment and the internal state, and a next observed value Ob(T+$\Delta$T) that is observed at next time T+$\Delta$T as a result of the behavior is input to the predictive learning unit. The next observed value Ob(T+$\Delta$T) includes a body image, a used tool, and a physical environment.

The predictive learning unit performs predictive learning based on the predicted value Pr(T+$\Delta$T) and the next observed value Ob(T+$\Delta$T). For example, the predictive learning unit performs learning based on deviation or correlation between the predicted value Pr(T+$\Delta$T) and the next observed value Ob(T+$\Delta$T). A model of the tool is therefore learned in the predictive learning unit.

As described above, according to an embodiment of the present invention, a learning mechanism allows self-development of a robot apparatus.

An excessively complicated theme may cause learning results to be less converged, leading to inefficient learning. According to an embodiment of the present invention, the learning mechanism has the concept of development scenario.

A development scenario includes a plurality of learning phases. In each learning phase, factors of a flexible movement realized by the robot apparatus, e.g., the joint angle, the torque limit, etc., or a list of behaviors to be performed, e.g., instinctive behaviors, reflexive behaviors, etc., is defined at individual stages of learning.

Each learning phase is managed using files. The development scenario is realized by accessing files corresponding to individual stages of learning.

Changes of the learning phases may be controlled over time, or may be controlled based on deviation or correlation between the predicted value Pr(T+$\Delta$T) estimated by the predictive learning unit and the next observed value Ob(T+$\Delta$T). When the robot acts in accordance with a predicted value, it may be determined that the current learning phase has been accomplished, and the robot may enter the next learning phase.

Figure 14:
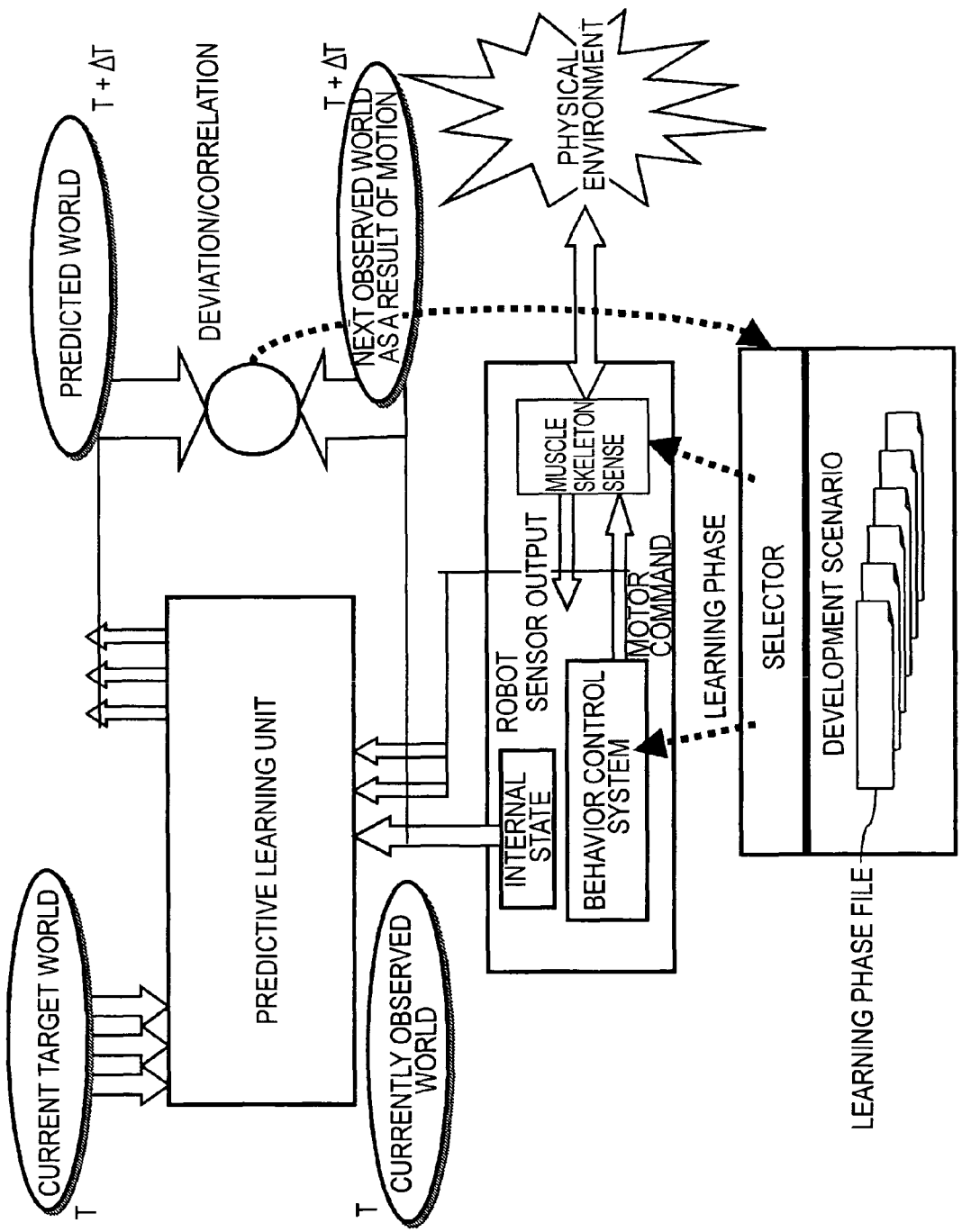
FIG. 14 is a schematic system configuration diagram of a predictive learning unit with a development scenario.

FIG. 14 schematically shows the system configuration of a predictive learning unit with a development scenario.

The robot apparatus, or a real robot, includes actuators and frames serving as muscles and skeletons of a human being or any other animal after which the robot is modeled, and sensors serving as the senses for detecting external stimuli. A behavior control system of the robot apparatus keeps a current internal state, and determines a behavior to be exhibited in response to the internal state and an external environment recognized by the sensors.

The predictive learning unit performs learning and evaluation based on a target world, or a target value, and a currently observed world, or a current observed value. The predictive learning unit may be formed of a feed-forward neural network or a correlation learning unit.

At current time T, the robot executes an input motor command, and inputs a current observed value Ob(T) to the predictive learning unit. The current observed value Ob(T) includes results (e.g., a joint angle, a motor torque, etc.) of activation of the motor, a sensor output indicating a measured physical environment or external stimulus, and an internal state that changes based on the results of activation of the motor and the sensor output.

The development scenario includes learning phase files, and each learning phase file defines factors (e.g., the joint angle, the torque limit, etc.) of a flexible movement to be realized in the corresponding learning phase, or a list of behaviors (e.g., instinctive behaviors, reflexive behaviors, etc) to be performed. A selector extracts a learning phase file adapted to the current learning stage of the robot. The robot executes a motor command according to the particulars defined in the extracted file.

A target value generator (not shown) generates a target value Ta(T) at current time T, and inputs it to the predictive learning unit. The target value Ta(T) includes results of activation of the motor, a sensor output, and an internal state.

The predictive learning unit estimates a predicted value Pr(T+ΔT) indicating results of activation of the motor, a sensor output, and an internal state, which are predicted at next time T+ΔT. This estimation may be performed using feed-forward neural network learning or correlation learning.

In the robot, a behavior to be executed at next time T+ΔT, or a motor command, is generated based on the behavior control described above in response to the external environment and the internal state, and a next observed value Ob(T+ΔT) that is observed at next time T+ΔT as a result of the behavior is input to the predictive learning unit. The next observed value Ob(T+ΔT) includes results of activation of the motor, a sensor output indicating a measured physical environment or external stimulus, and an internal state that changes based on the results of activation of the motor and the sensor output. The motor command is executed according to the definition of each learning phase.

The predictive learning unit performs predictive learning based on the predicted value Pr(T+ΔT) and the next observed value Ob(T+ΔT). For example, the predictive learning unit performs learning based on deviation or correlation between the predicted value Pr(T+ΔT) and the next observed value Ob(T+ΔT).

The selector controls changes of the learning phases over time or based on deviation or correlation between the predicted value Pr(T+ΔT) and the next observed value Ob(T+ΔT). When the robot acts in accordance with a predicted value, it is determined that the current learning phase has been accomplished, and a file corresponding to the next learning phase is extracted from the development scenario to continue learning.

Reward and evaluation are performed based on an internal state and are also performed based on evaluation design in which the internal state is set for high evaluation. An instinctive behavior or a reflexive behavior is selected based on the design of reward and evaluation. A target may be generated based on the design of reward and evaluation. In the predictive learning unit, an internal state that is highly evaluated is stored as a target state while searching instinctive and reflexive behaviors. Thus, a behavior having the target state can easily be generated without performing search in later learning.

Figure 15:
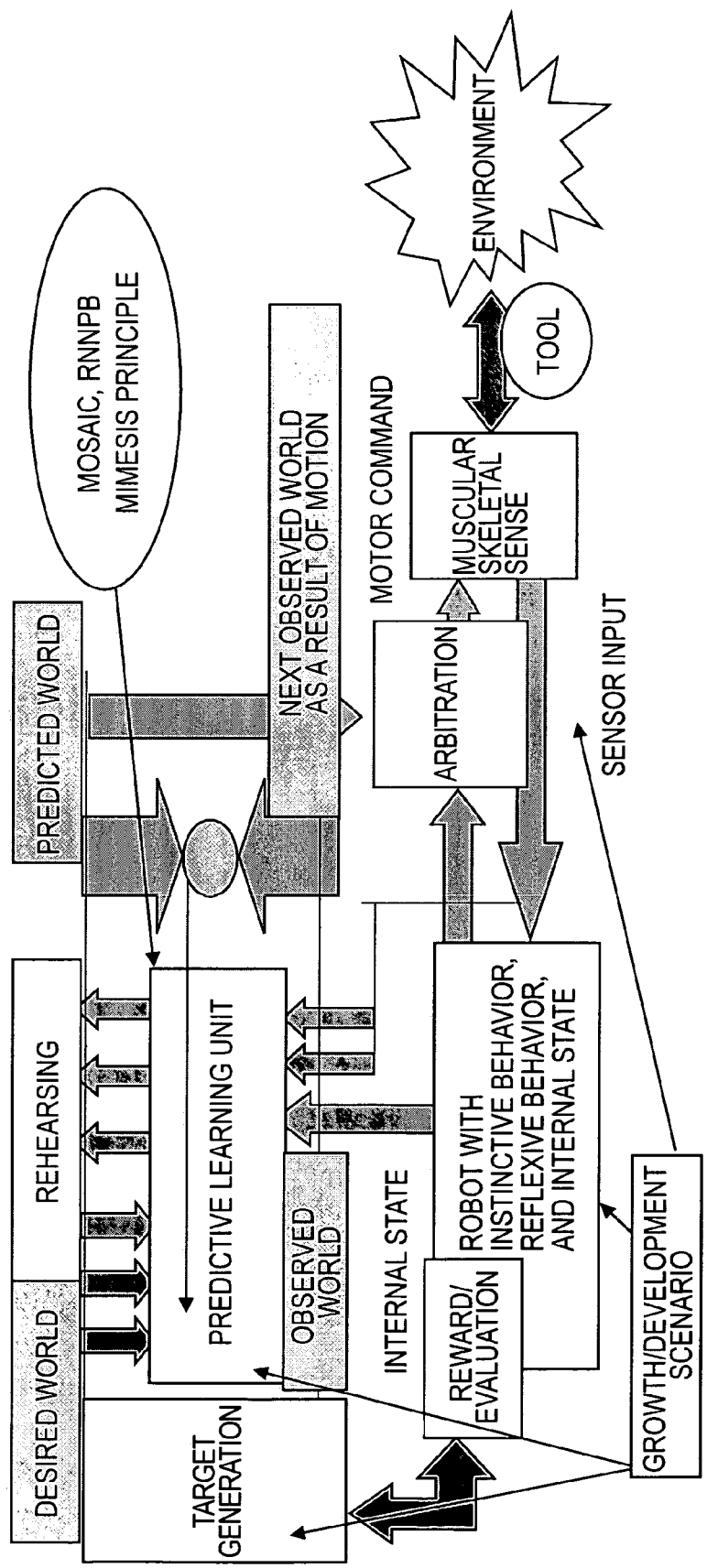
FIG. 15 is a diagram showing rehearsing and planning.

Referring to FIG. 15, in a rehearsing and planning system, a predictive learning unit that has learned a target is used to generate and rehearse progress of learning from a current state to a target state at time T, T+1, T+2, etc., by feeding back outputs of the predictive learning unit to the predictive learning unit without actually generating a behavior. Based on this rehearsing, an actual behavior is selected. A behavior for accomplishing the target can therefore be efficiently performed.

Behavior arbitration for arbitrating between an instinctive or reflexive behavior and a behavior generated by a predictive learning unit may be used to select a behavior to be actually output. When search, imitation, etc., are implemented as instinctive or reflexive behaviors, a robot apparatus performs behaviors while learning through the output instinctive or reflexive behaviors. At a certain learning stage, deviation allows arbitration using an output of the predictive learning unit. Therefore, the robot apparatus can perform learning and can perform an autonomous behavior using an output of the predictive learning unit at a certain learning stage.

While specific embodiments of the present invention have been described in detail, a variety of modifications of alternations may be made to these embodiments by a person skilled in the art without departing from the scope of the present invention.

The present invention is not limited to a product termed "robot". The present invention may also be applicable to other mechanical apparatuses which utilize electric or magnetic actions to perform motions which resemble human motions, such as products belonging to other industrial field, e.g., toys.

In summary, the present invention has been disclosed in an exemplary form, and this form should not be construed as the restricted one. Reference should be made to the appended claims for delineation of the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A voice control system, of a robot, for learning a phoneme sequence, comprising:
    sound inputting means for inputting a phoneme sequence, the sound inputting means including a cochlear filter bank;
    sound signal learning means for converting the input phoneme sequence into a first sound synthesis parameter in which speaker emotional individuality is reflected and for evaluating and learning a difference between (a) a second sound synthesis parameter of a robot phoneme sequence that is generated by the robot by imitating the input phoneme sequence, the second sound synthesis parameter generated based upon an internal state of the robot determined from self-analysis of the robot's voice via the cochlear filter bank of the sound inputting means and (b) the first sound synthesis parameter, of the speaker, which is used for sound imitation; and
    sound synthesizing means for generating the robot phoneme sequence which imitates the input phoneme sequence of the speaker, the robot phoneme sequence to be output based on the first and second sound synthesis parameters obtained by the sound signal learning means, wherein the robot phoneme sequence to be output is pronounced with different characteristics based on the internal state of the robot, the internal state including emotions such as instincts and feelings, and wherein the robot phoneme sequence output by the sound synthesizing means is input to the cochlear filter bank of the sound inputting means to generate the second sound synthesis parameter for self-analysis of the robot's voice.

2. The system according to claim 1, wherein the sound signal learning means is formed of a feed-forward neural network.

3. The system according to claim 1, further comprising:
internal state generating means for generating the internal state of the robot due to a body constraint of the robot; and
mapping means for mapping the internal state to a sound synthesis parameter.

4. The system according to claim 3, wherein the mapping means inversely estimates the internal state corresponding to an input sound synthesis parameter using an inverse function during mapping.

5. A voice control method, of a robot, for learning a phoneme sequence, comprising the steps of:
inputting a phoneme sequence at an input unit, including a cochlear filter bank;
converting the input phoneme sequence into a first sound synthesis parameter in which speaker emotional individuality is reflected, and evaluating and learning a difference between (a) a second sound synthesis parameter of a robot phoneme sequence that is generated by the robot by imitating the input phoneme sequence, the second sound synthesis parameter generated based upon an internal state of the robot determined from self-analysis of the robot's voice via the cochlear filter bank of the input unit and (b) the first sound synthesis parameter, of the speaker, which is used for sound imitation; and
generating the robot phoneme sequence which imitates the speaker, the robot phoneme sequence to be output based on the first and second sound synthesis parameters, wherein the robot phoneme sequence to be output is pronounced with different characteristics based on the internal state of the robot, the internal state including emotions such as instincts and feelings, and wherein the output robot phoneme sequence is fed back to the cochlear filter bank of the input unit to generate the second sound synthesis parameter used for self analysis of the robot's voice.

6. The method according to claim 5, wherein in the step of learning or evaluating, learning based on a feed-forward neural network is performed.

7. The method according to claim 5, further comprising the steps of:
generating the internal state of the robot due to a body constraint of the robot; and
mapping the internal state to a sound synthesis parameter.

8. The method according to claim 5, further comprising the step of inversely estimating the internal state corresponding to an input sound synthesis parameter using an inverse function during mapping performed in the step of mapping.

9. A robot apparatus for learning a phoneme sequence, comprising:
a plurality of movable sections;
driving means for driving the plurality of movable sections;
driving control means for controlling the driving means;
sound inputting means for inputting a phoneme sequence, the sound inputting means including a cochlear filter bank;
sound signal learning means for converting the input phoneme sequence into a first sound synthesis parameter in which speaker emotional individuality is reflected and for evaluating and learning a difference between (a) a second sound synthesis parameter of a robot phoneme sequence that is generated by the robot apparatus imitating the input phoneme sequence, the second sound synthesis parameter generated based upon an internal state of the robot determined from self-analysis of the robot's voice via the cochlear filter bank of the sound inputting means and (b) the first sound synthesis parameter, of the speaker, which is used for sound imitation; and
sound synthesizing means for generating the robot phoneme sequence which imitates the input phoneme sequence of the speaker, the robot phoneme sequence to be output based on the first and second sound synthesis parameters obtained by the sound signal learning means, wherein the robot phoneme sequence to be output is pronounced with different characteristics based on the internal state of the robot, the internal state including emotions such as instincts and feelings, and wherein the robot phoneme sequence output by the sound synthesizing means is input to the cochlear filter bank of the sound inputting means to generate the second sound synthesis parameter for self-analysis of the robot's voice.

10. A voice control system, of a robot, for learning a phoneme sequence, comprising:
a sound inputting device inputting a phoneme sequence, the sound inputting device including a cochlear filter bank;
a sound signal learning unit operable to convert the input phoneme sequence into a first sound synthesis parameter in which speaker emotional individuality is reflected and to evaluate and to learn a difference between (a) a second sound synthesis parameter of a robot phoneme sequence that is generated by the robot by imitating the input phoneme sequence, the second sound synthesis parameter generated based upon an internal state of the robot determined from self-analysis of the robot's voice via the cochlear filter bank of the sound inputting device and (b) the first sound synthesis parameter, of the speaker, which is used for sound imitation; and
a sound synthesizer operable to generate the robot phoneme sequence which imitates the input phoneme sequence of the speaker, the robot phoneme sequence to be output based on the first and second sound synthesis parameters obtained by the sound signal learning unit, wherein the robot phoneme sequence to be output is pronounced with different characteristics based on the internal state of the robot, the internal state including emotions such as instincts and feelings, and wherein the robot phoneme sequence output by the sound synthesizer is input to the cochlear filter bank of the sound inputting device to generate the second sound synthesis parameter for self-analysis of the robot's voice.

11. A robot apparatus for learning a phoneme sequence, comprising:
a plurality of movable sections;
a driving unit driving the plurality of movable sections;
a driving control unit controlling the driving unit;
a sound inputting device inputting a phoneme sequence, the sound inputting device including a cochlear filter bank;
a sound signal learning unit operable to convert the input phoneme sequence into a first sound synthesis parameter in which speaker emotional individuality is reflected and to evaluate and to learn a difference between (a) a second sound synthesis parameter of a robot phoneme sequence that is generated by the robot apparatus by imitating the input phoneme sequence, the second sound synthesis parameter generated based upon an internal state of the robot determined from self-analysis of the robot's voice via the cochlear filter bank of the sound inputting device and (b) the first sound synthesis parameter, of the speaker, which is used for sound imitation; and a sound synthesizer operable to generate the robot phoneme sequence which imitates the input phoneme sequence of the speaker, the robot phoneme sequence to be output based on the first and second sound synthesis parameters obtained by the sound signal learning unit, wherein the robot phoneme sequence to be output is pronounced with different characteristics based on the internal state of the robot, the internal state including emotions such as instincts and feelings, and wherein the robot phoneme sequence output by the sound synthesizer is input to the cochlear filter bank of the sound inputting device to generate the second sound synthesis parameter for self-analysis of the robot's voice.

* * * * *